J. B. GRAHAM.
MACHINE FOR MAKING HOLLOW GLASSWARE.
APPLICATION FILED NOV. 12, 1917.
1,405,204.
Patented Jan. 31, 1922.
17 SHEETS—SHEET 7.
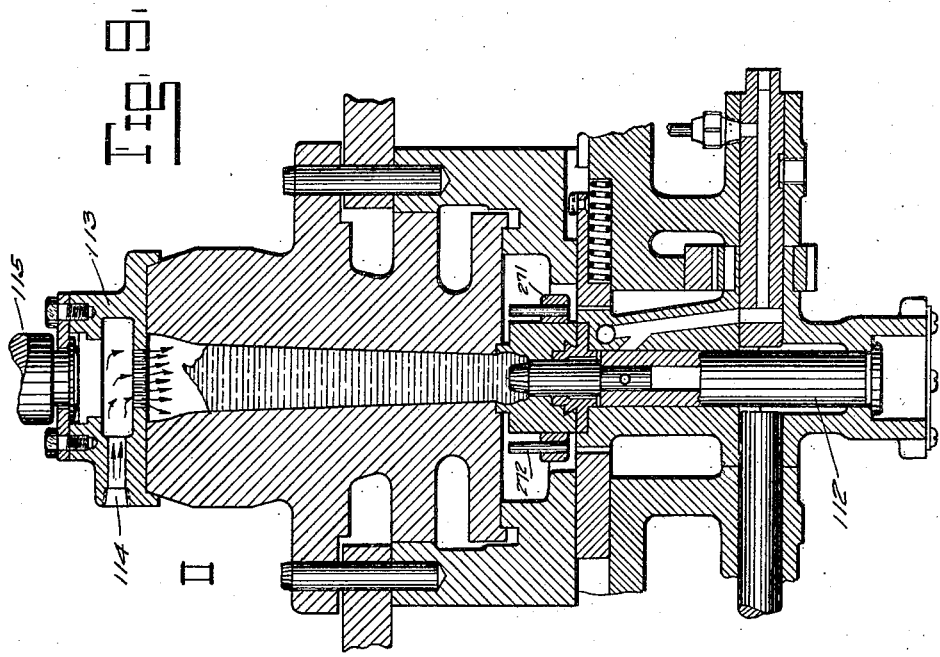
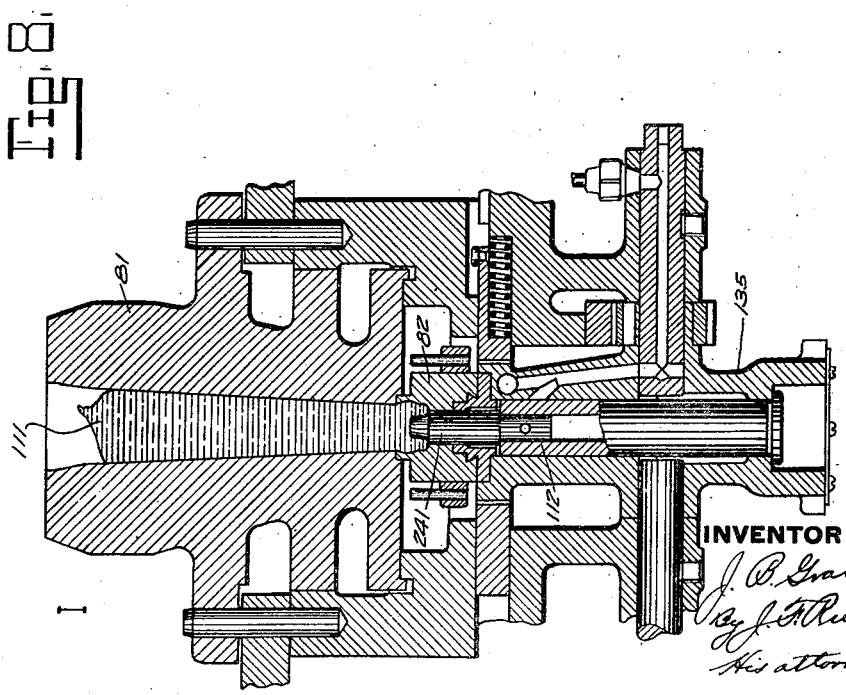
INVENTOR

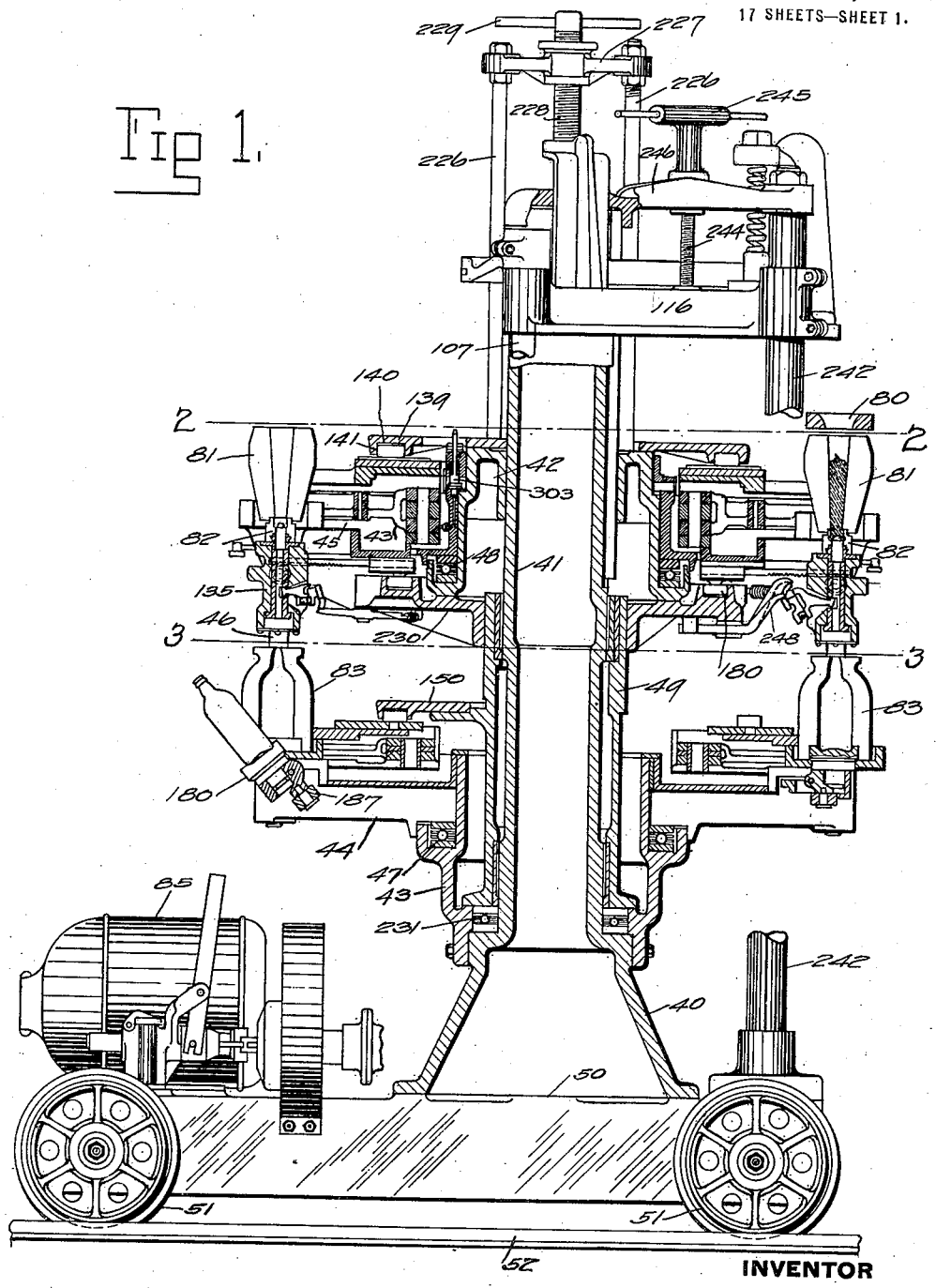

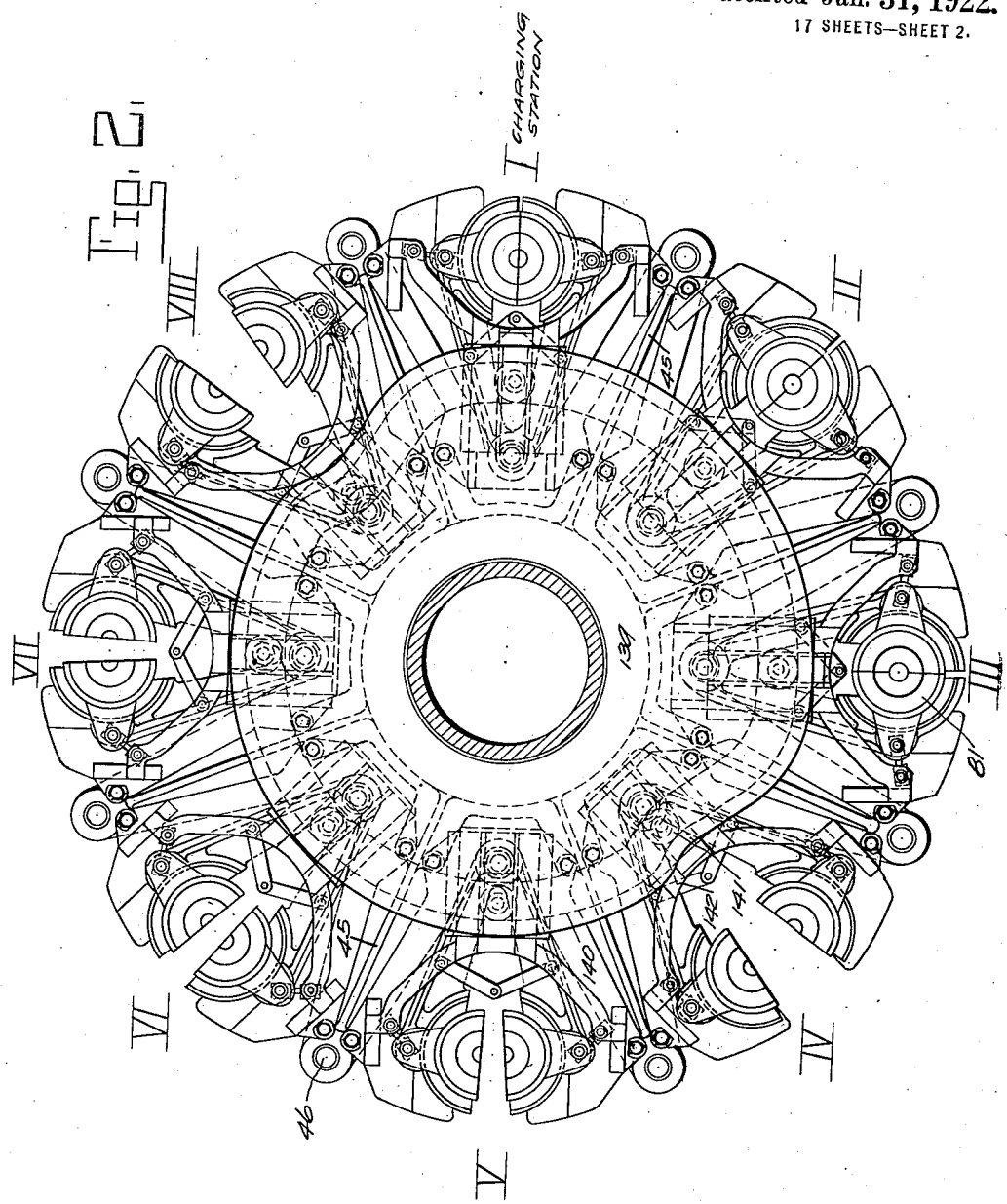

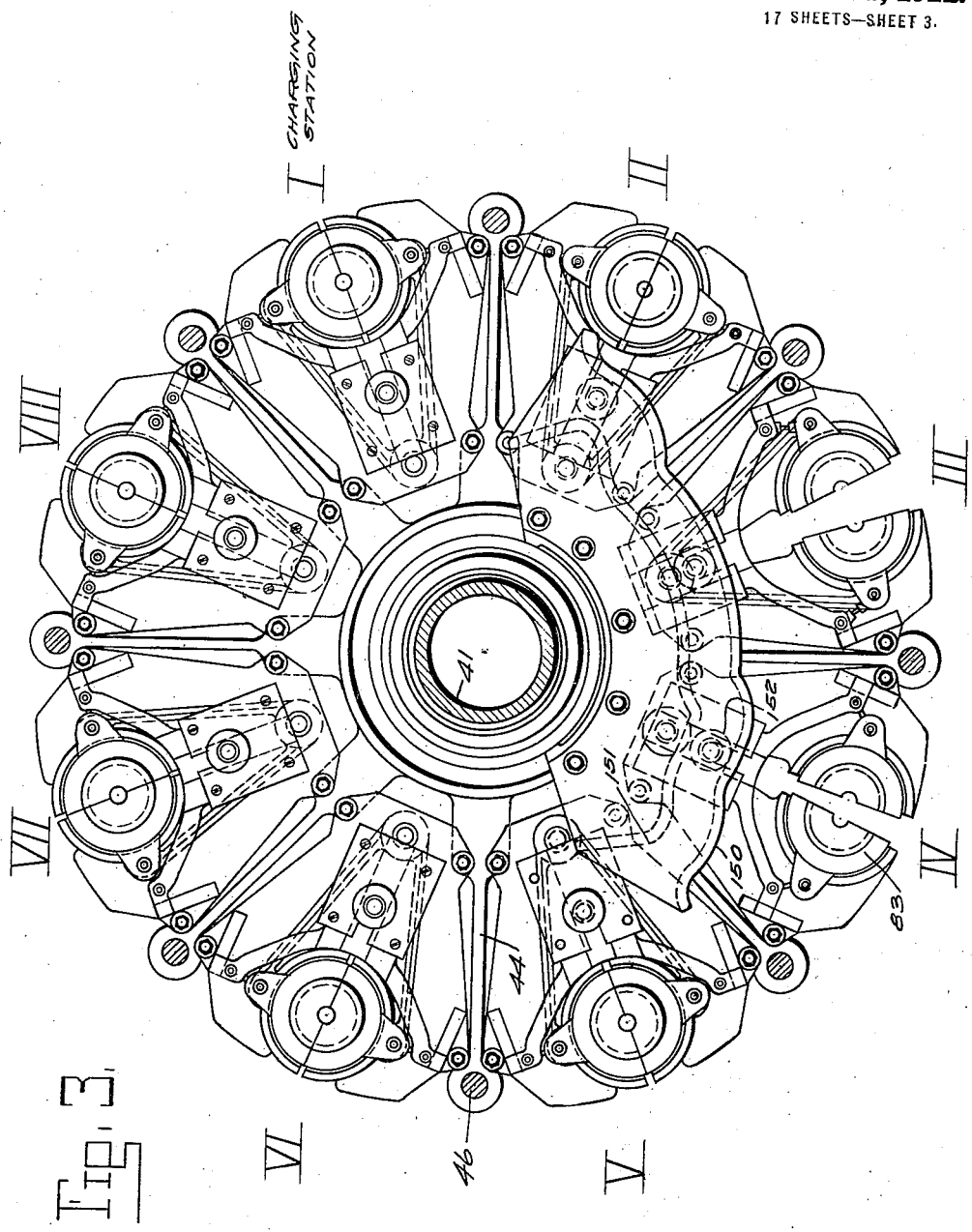

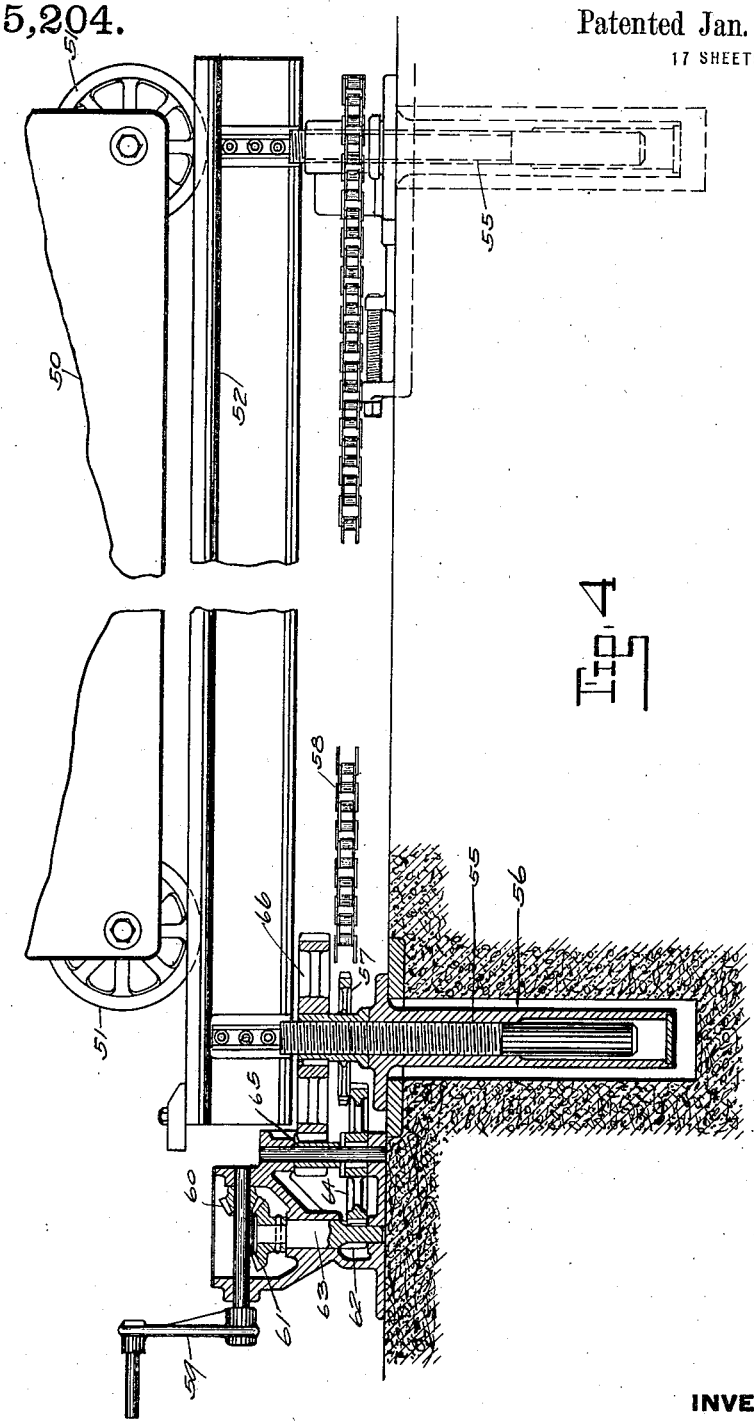

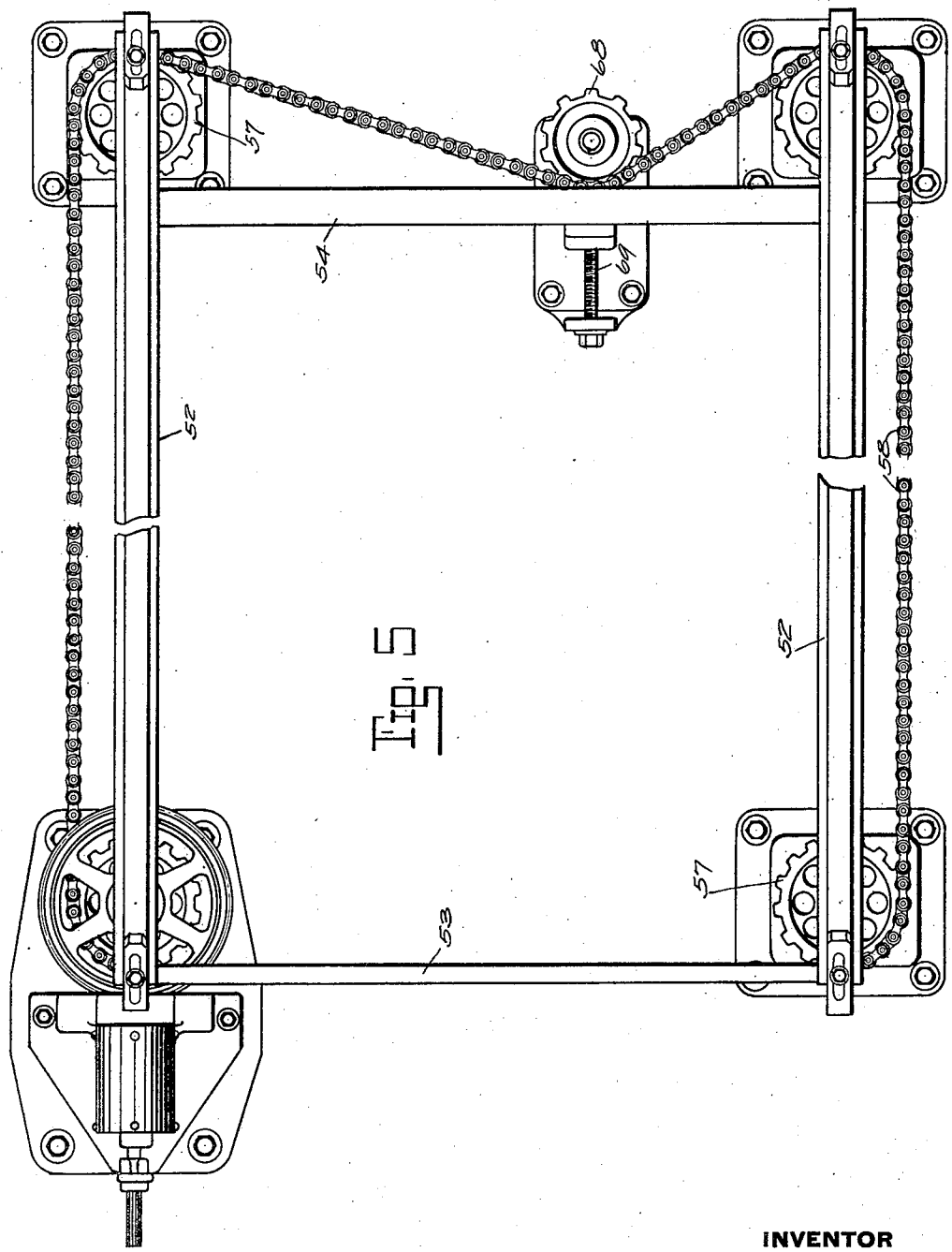

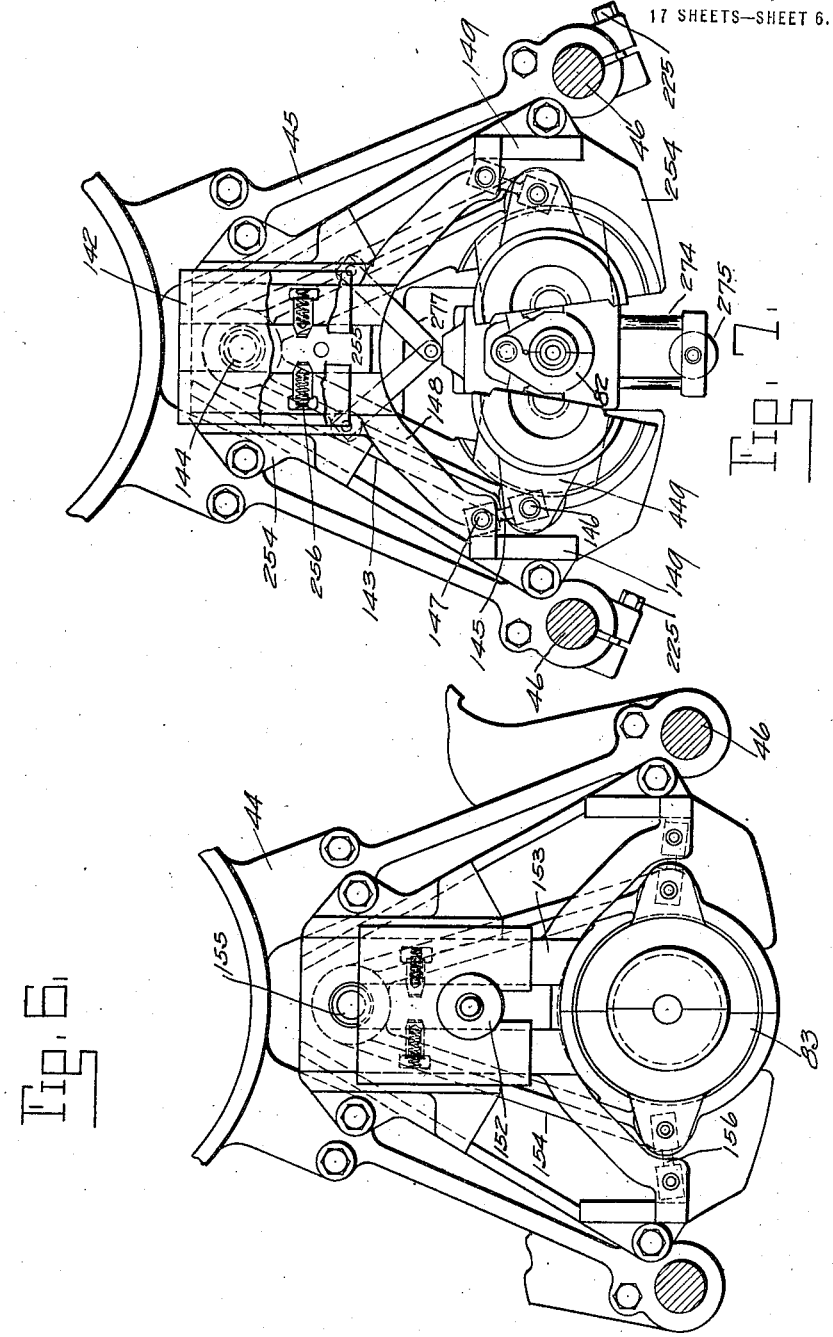

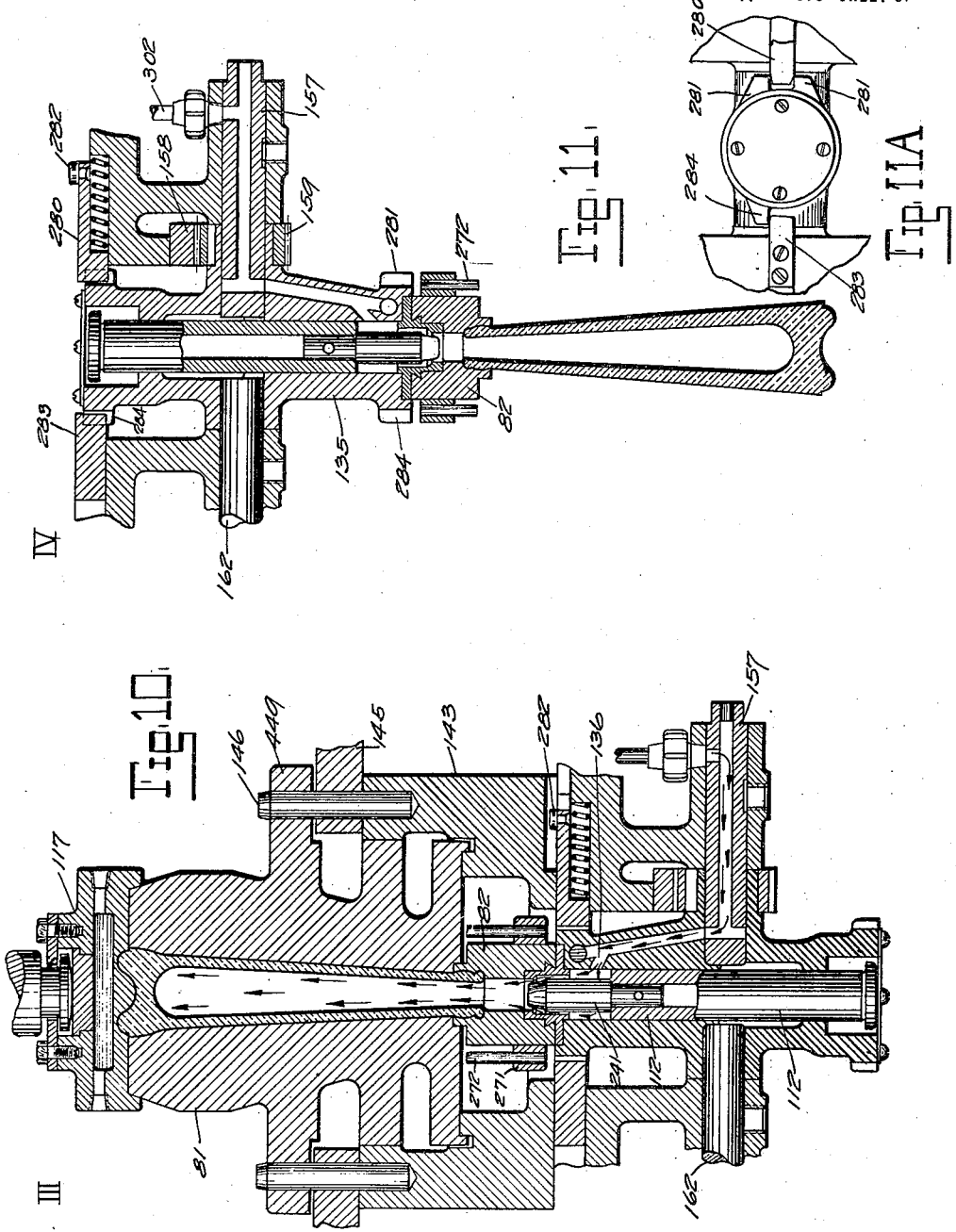

J. B. GRAHAM.
MACHINE FOR MAKING HOLLOW GLASSWARE.
APPLICATION FILED NOV. 12, 1917.
1,405,204.
Patented Jan. 31, 1922.
17 SHEETS—SHEET 9.
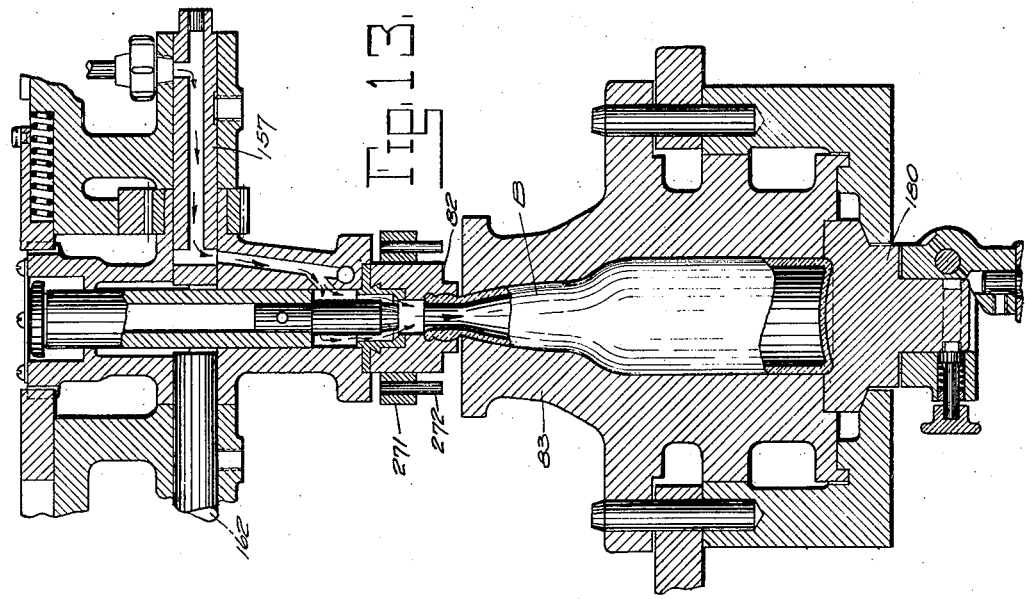
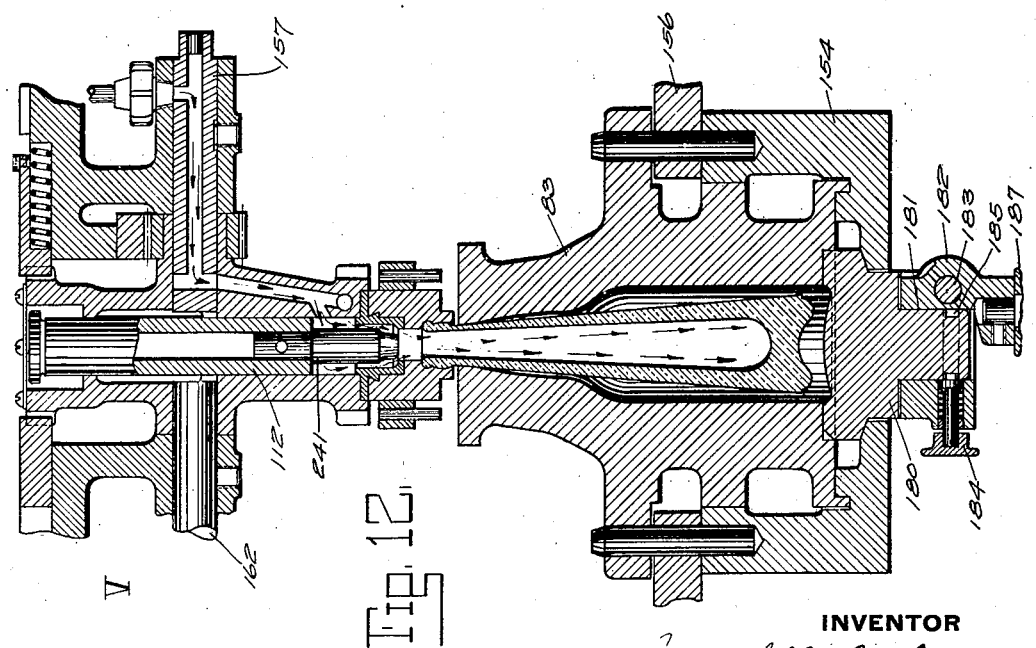
INVENTOR
Joseph B. Graham
By J. F. Rule,
His attorney.

J. B. GRAHAM.
MACHINE FOR MAKING HOLLOW GLASSWARE.
APPLICATION FILED NOV. 12, 1917.
1,405,204.
Patented Jan. 31, 1922.
17 SHEETS—SHEET 10.
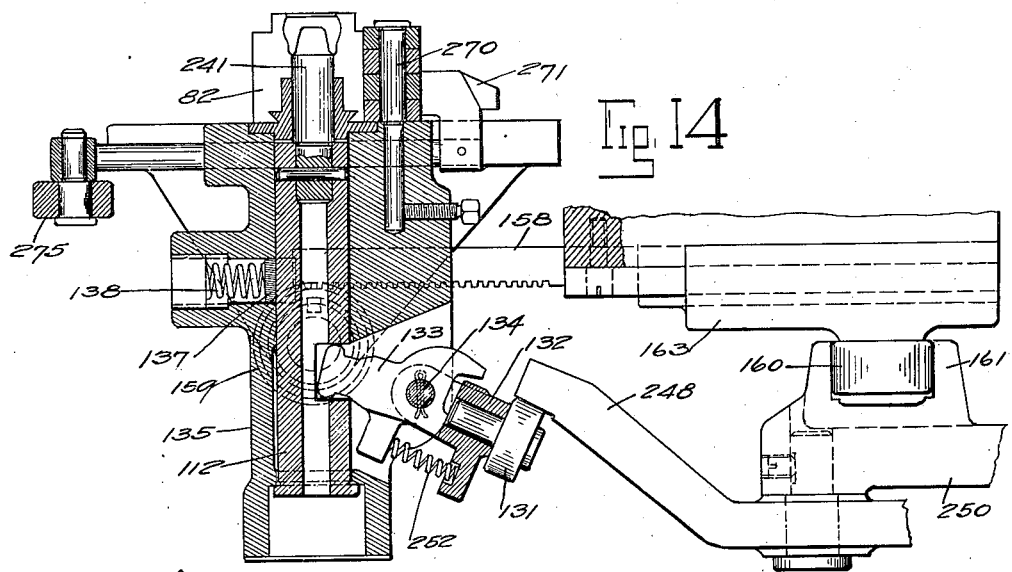
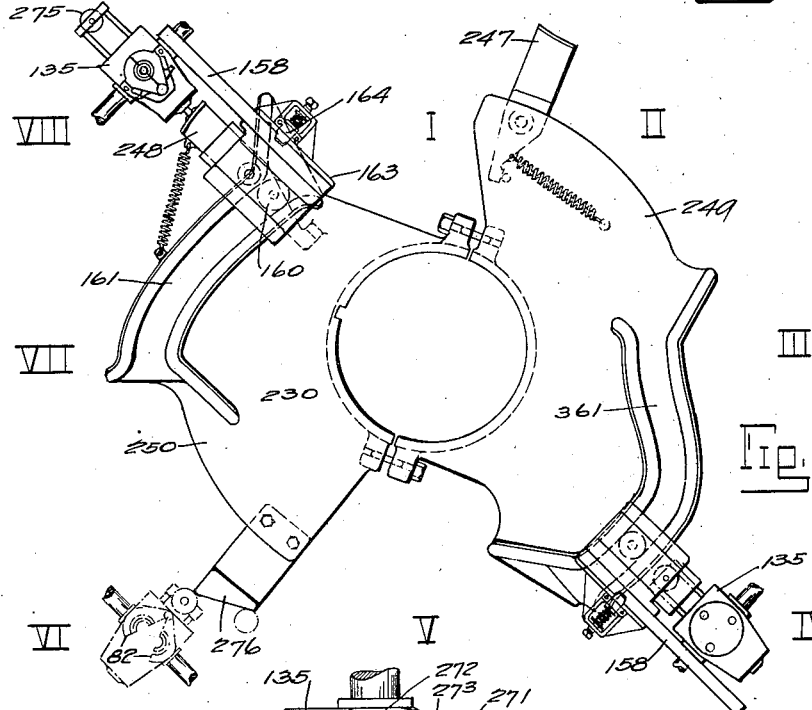
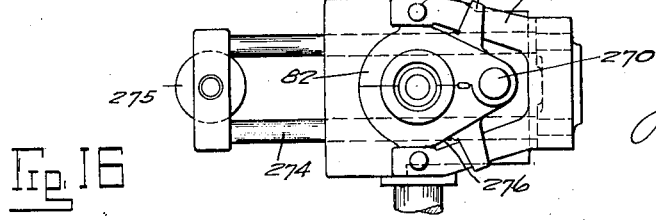
INVENTOR
Joseph B. Graham
By J. F. Rule.
His attorney

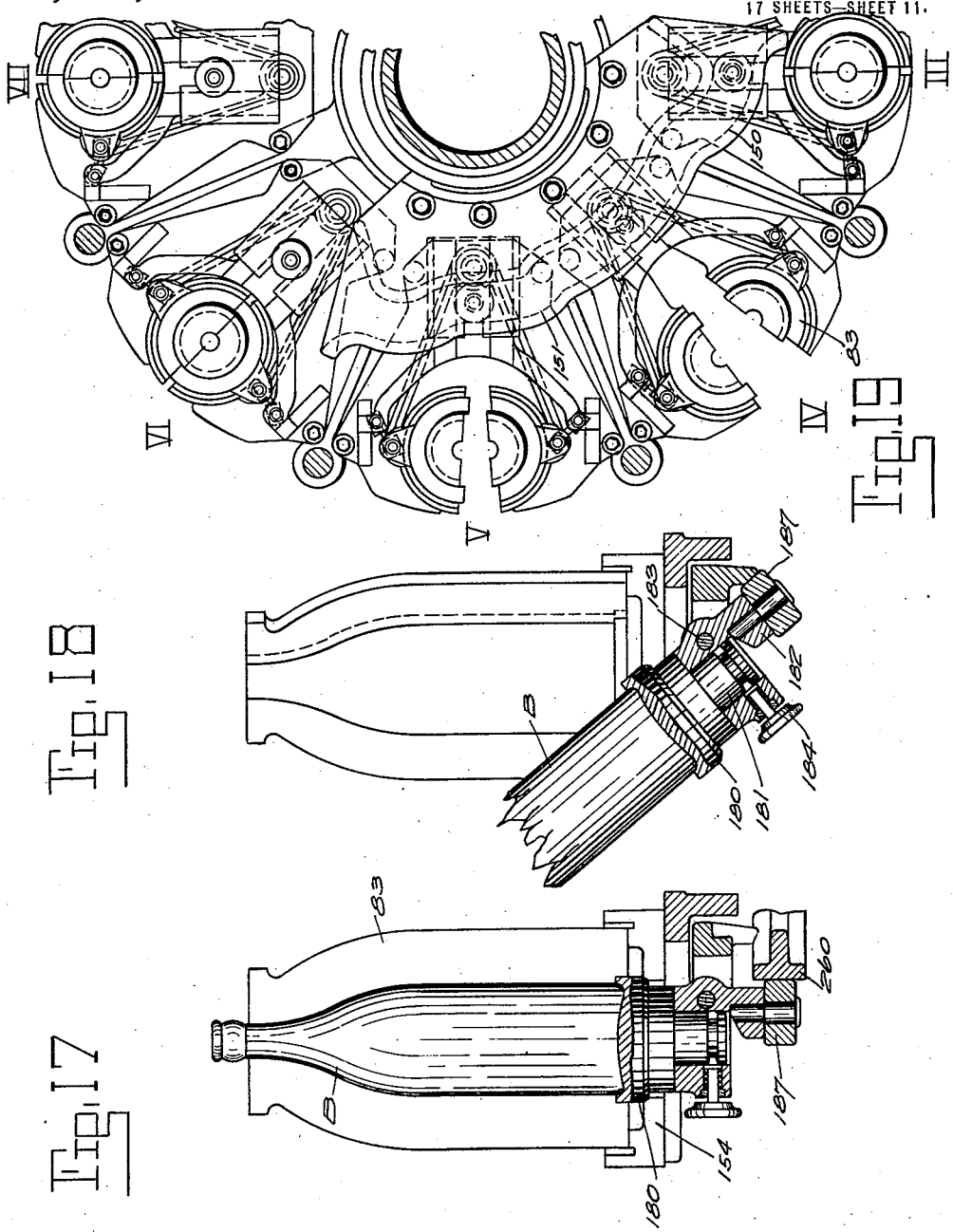

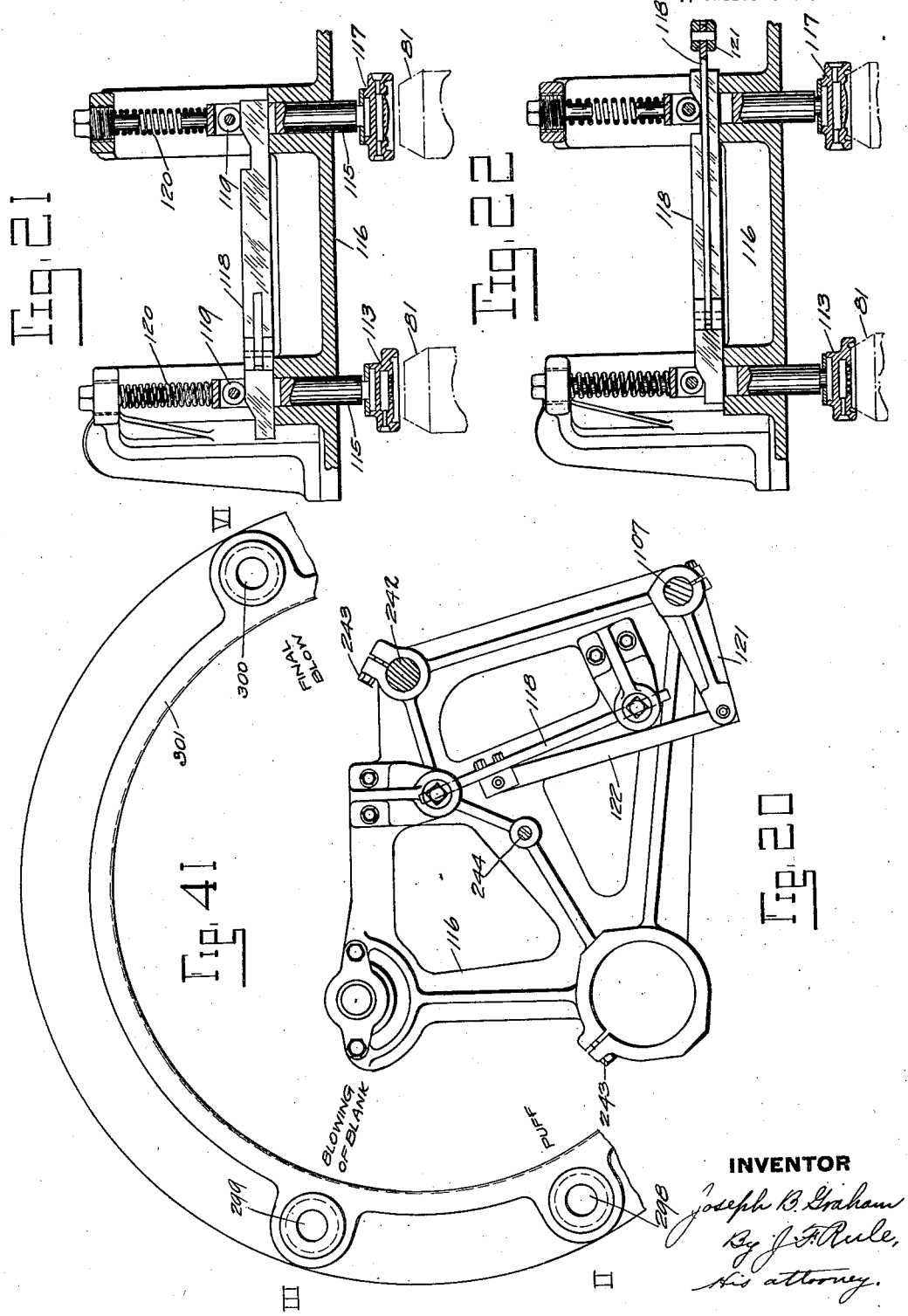

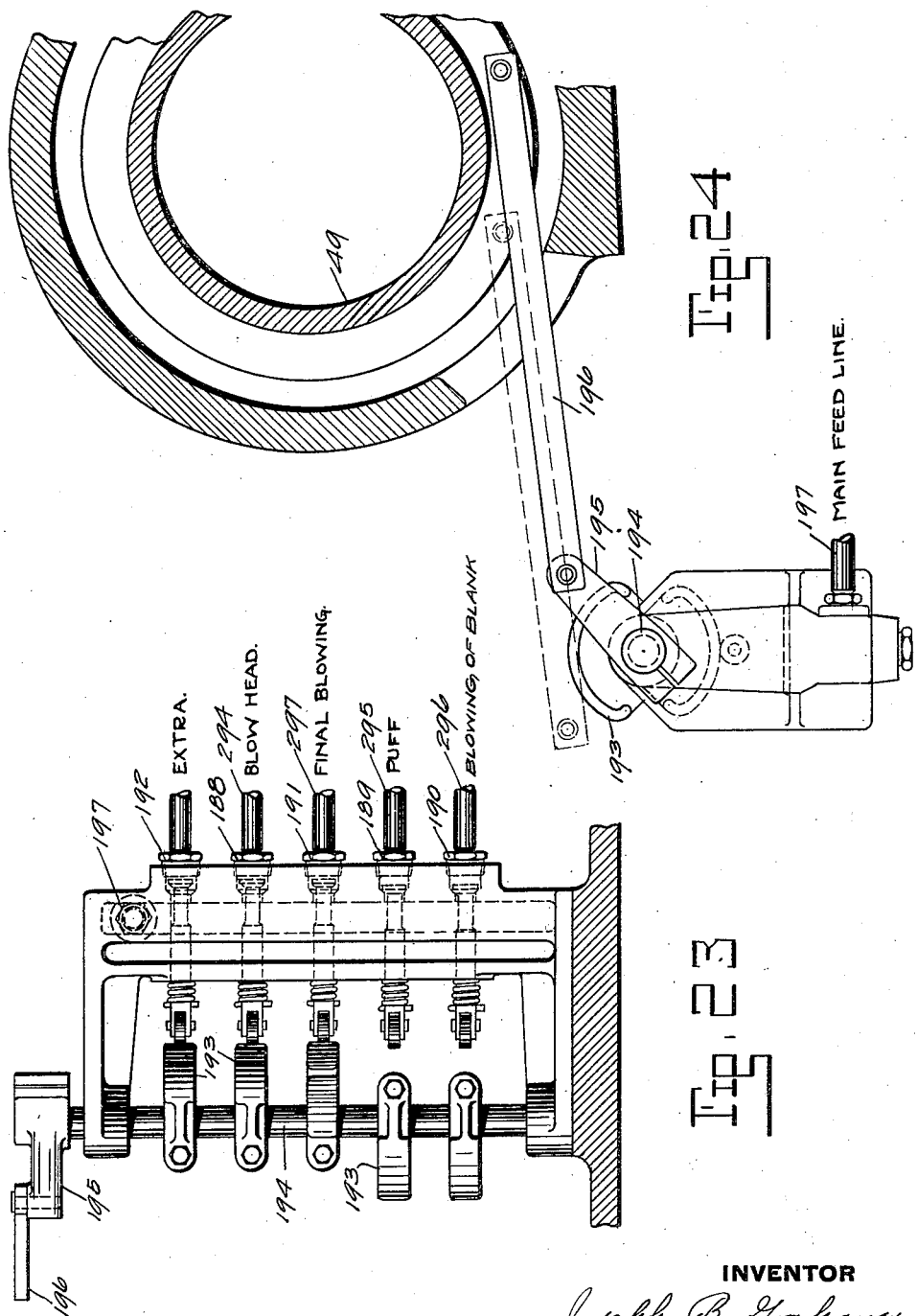

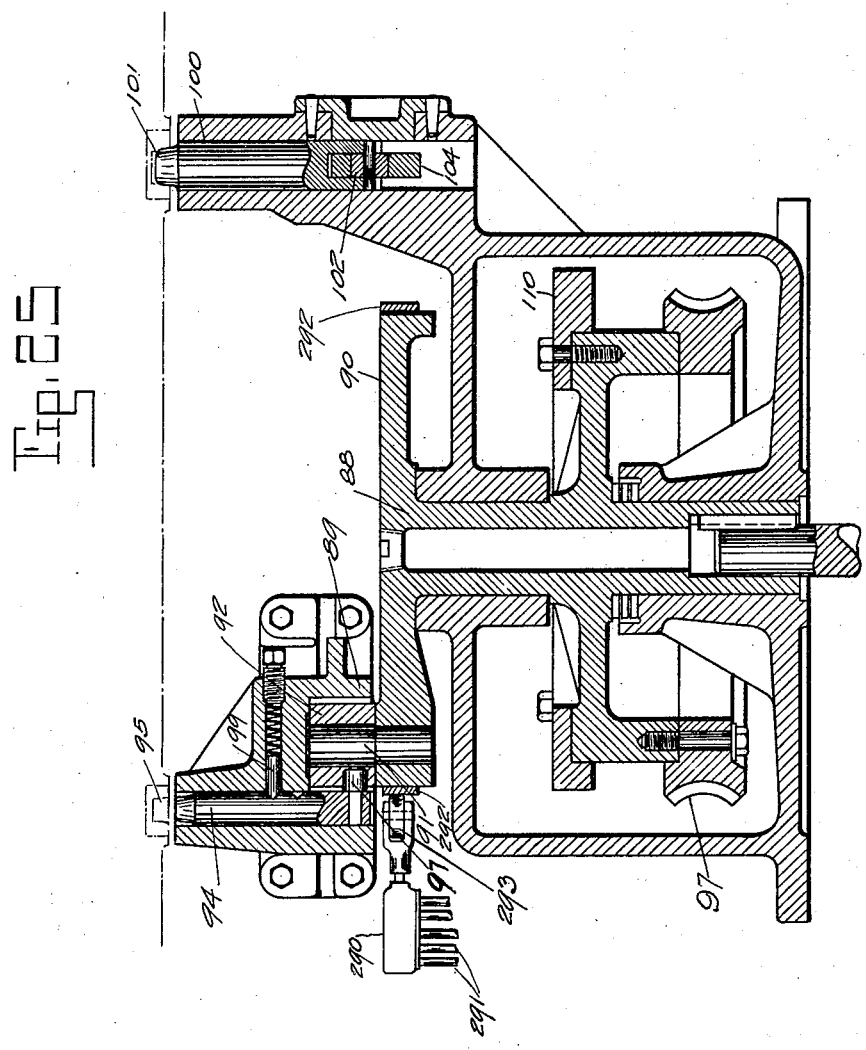

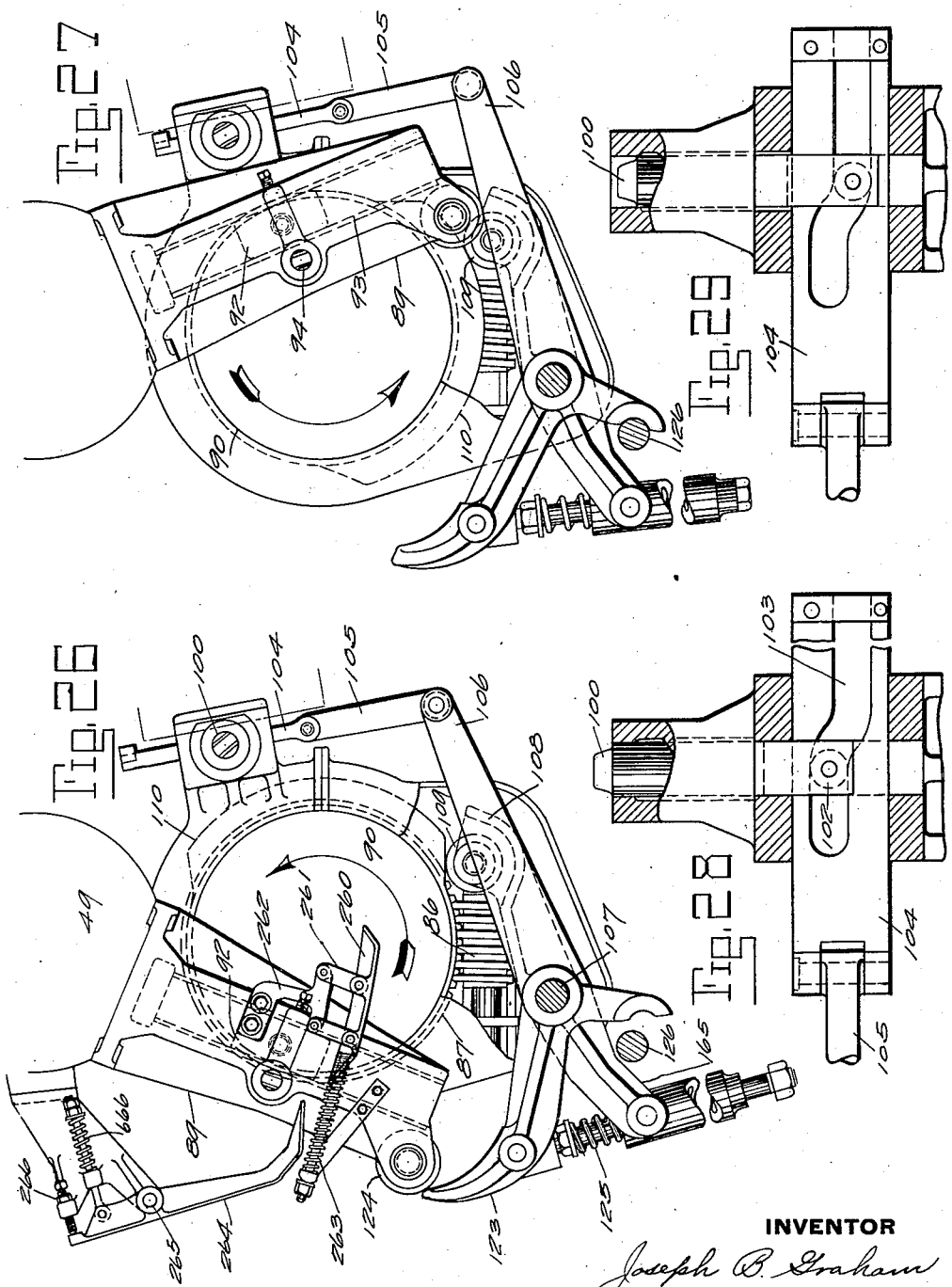

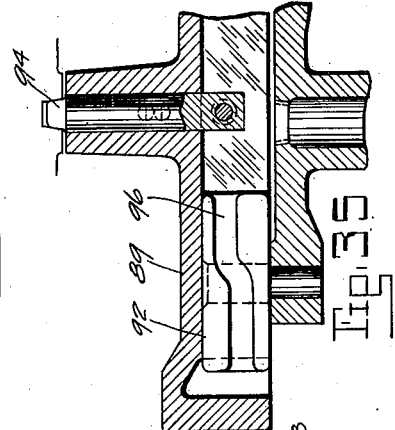
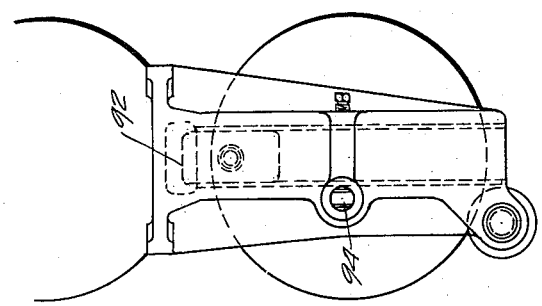
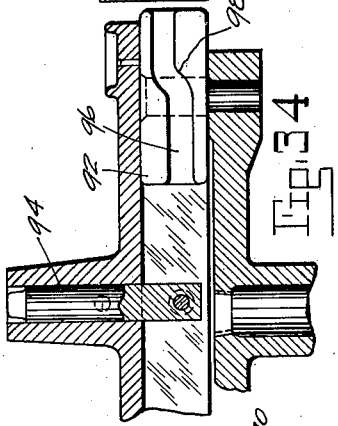
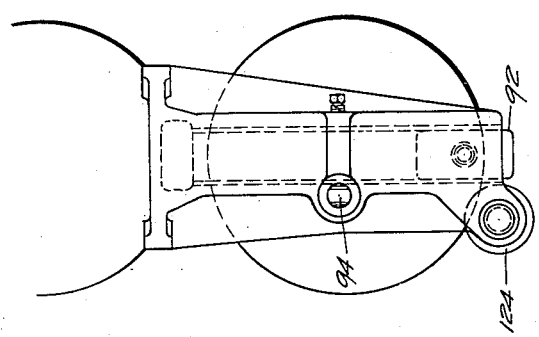
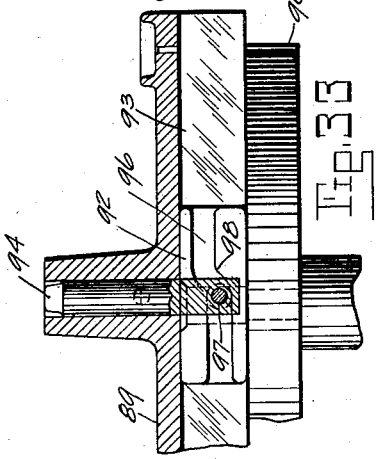
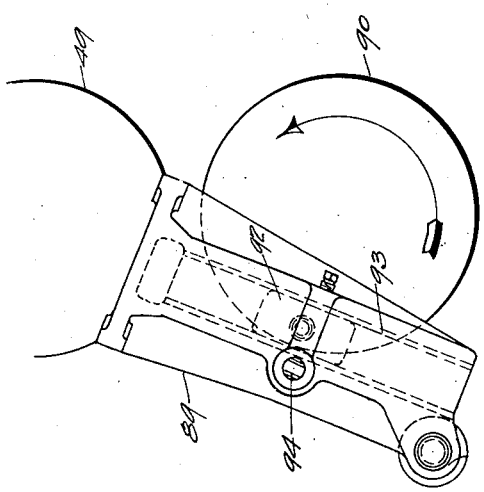

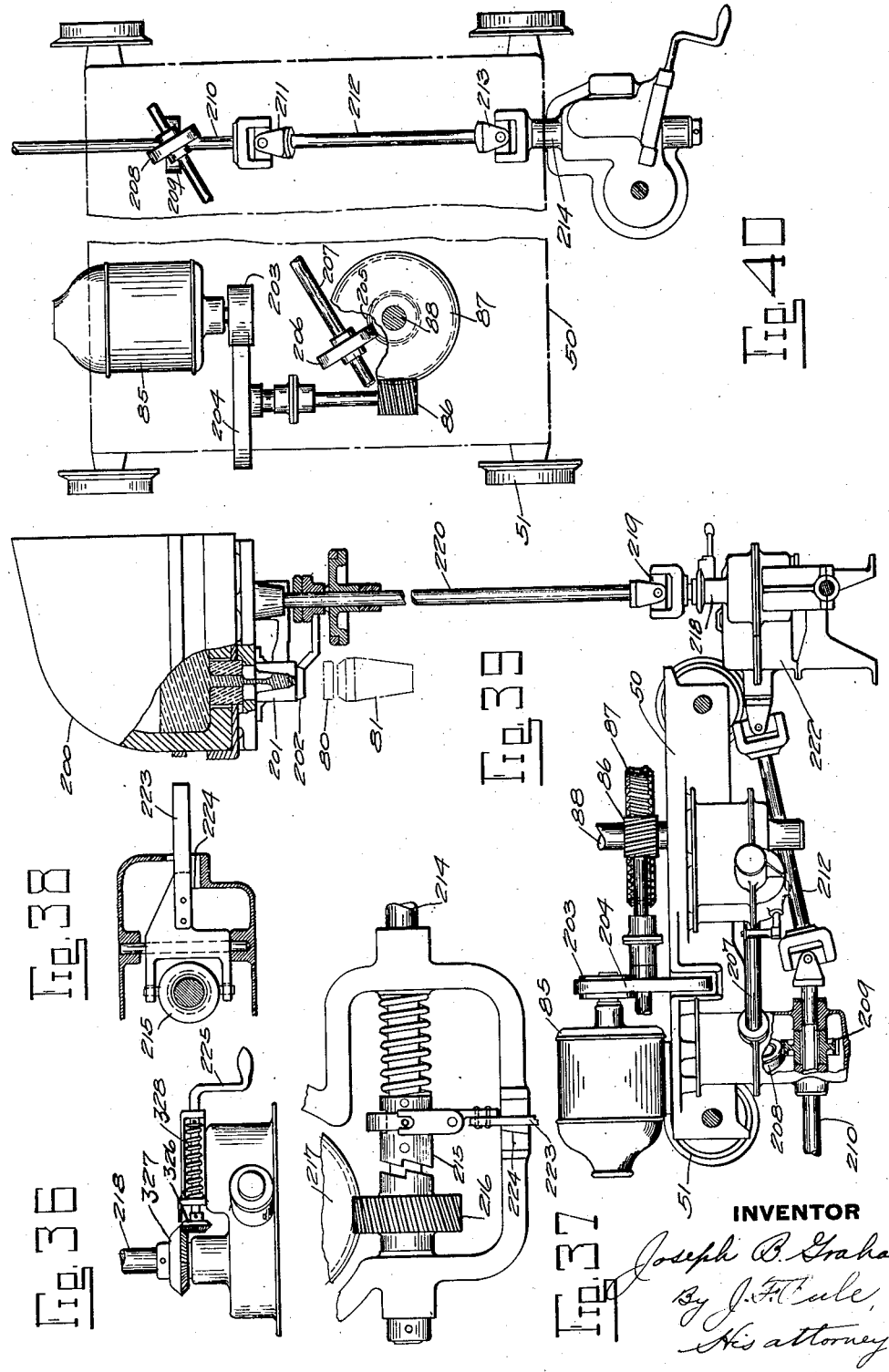

UNITED STATES PATENT OFFICE.

JOSEPH B. GRAHAM, OF EVANSVILLE, INDIANA, ASSIGNOR TO THE OWENS BOTTLE COMPANY, OF TOLEDO, OHIO, A CORPORATION OF OHIO.

MACHINE FOR MAKING HOLLOW GLASSWARE.

1,405,204.    Specification of Letters Patent.    Patented Jan. 31, 1922.

Application filed November 12, 1917. Serial No. 201,644.

*To all whom it may concern:*

Be it known that I, JOSEPH B. GRAHAM, a citizen of the United States, residing at Evansville, in the county of Vanderburg and State of Indiana, have invented new and useful Improvements in Machines for Making Hollow Glassware, of which the following is a specification.

My invention relates to machines for manufacturing hollow articles of glassware, and particularly to automatic machines in which charges of molten glass are received in blank or parison molds and after being partly formed therein are transferred to finishing molds in which the parisons are blown to the form of the finished article.

An object of the invention is to produce a machine for manufacturing a high grade of hollow glassware at a minimum cost, and to this end a machine is provided which is entirely automatic in its operations, and which possesses various novel features of advantage in construction and methods of operation, as will more fully hereinafter appear.

In its preferred form, the machine comprises a mold carriage rotatable step by step about a vertical axis. The blank molds which are arranged in a circle on the carriage with their upper ends open to receive the charges of molten glass, are thus brought successively into charging position. Beneath the blank molds and in register therewith are neck molds in which the necks of the bottles or other articles are formed. The neck mold and body blank mold together form a parison mold in which the glass is blown to partly form the article. The body blank mold is then opened, leaving the parison supported by and projecting upwardly from the neck mold. The latter is then rotated to swing the parison outwardly and downwardly into an open finishing mold, which is then closed around the parison, after which the parison is blown to the form of the finished article.

A further feature of the invention relates to improved indexing means for rotating the mold carriage step by step, comprising mechanism which is powerful and positive in action, which provides a smooth and gradual starting and stopping of the carriage and which moreover allows the carriage to remain at rest after each rotation for a longer time interval than that in which it is moving. During these rest periods the blowing and other operations are performed, as fully set forth hereinafter.

Various other features and advantages of the invention will appear hereinafter.

In the accompanying drawings which illustrate a machine embodying the principles of my invention, Figure 1 is a sectional elevation of the machine, portions of the apparatus being shown as moved somewhat out of normal position into the plane of the section to show the construction.

Figure 2 is a sectional plan view at the plane indicated by the line 2—2 on Figure 1, and shows the blank molds.

Figure 3 is a sectional plan view at the plane of the line 3—3 on Figure 1, and shows the blow molds.

Figure 4 is a part sectional elevation showing the tracks on which the machine is mounted, and the mechanism for vertically adjusting the same.

Figure 5 is a plan view of the mechanism shown in Figure 4.

Figure 6 is a plan view on a larger scale of a finishing mold and its operating mechanism, the mold being shown in closed position.

Figure 7 is a similar view showing an open blank mold.

Figure 8 is a sectional elevation showing a blank mold, neck mold and the rotary head for inverting the blank, a charge of glass being shown as received in the mold at the charging station.

Figure 9 is a view similar to Figure 8 but showing in addition, the blowing head which at the second station is applied to the mold to guarantee by air pressure a full neck of glass.

Figure 10 is a similar view but showing the head at the third station where the blowhead shown in Figure 9 is replaced by a bottom-plate. This view also shows how compressed air is admitted through the neck mold for partially blowing the parison, and forming the bottom of the ware.

Figure 11 shows the neck mold carrier after it has been rotated to swing the parison downward.

Figure 11^A is a plan view of the neck mold carrier and the locating catch.

Figure 12 is a view similar to Figure 11 showing the blow mold closed about the parison.

Figure 13 is a view similar to Figure 12 but with the parison blown to its final shape.

Figure 14 is a part sectional elevation showing the neck mold and its carrying head, and mechanism for inverting the same, also mechanism for operating the plunger tip.

Figure 15 is a plan showing the cams for inverting, re-inverting, and opening the neck mold, and for actuating the plunger.

Figure 16 is a plan view of the neck mold.

Figure 17 is a part sectional view of the tilting bottom of the blow mold, said bottom being shown in normal position.

Figure 18 is a similar view with the bottom tilted to discharge the bottle.

Figure 19 is a view similar to a portion of Figure 3, but with the mold operating cam at the opposite limit of its movement.

Figure 20 is a plan view showing a cam bar and actuating means, for lifting and lowering the heads which engage the upper ends of the blank molds.

Figure 21 is a part sectional elevation of said heads and cam bar, said heads being lifted to clear the blank molds.

Figure 22 is a view similar to Figure 21 but shows the heads lowered to engage the molds.

Figure 23 is an elevation view of a bank of valves and cams for controlling the several blowing operations.

Figure 24 shows the means for actuating the cam shaft of Figure 23.

Figure 25 is a sectional elevation showing mechanism for rotating the mold carriage.

Figure 26 is a plan view of such mechanism.

Figure 27 is a view similar to Figure 26, but with the parts in a different position, and also omitting the mold bottom cams shown in Figure 26.

Figure 28 is a part sectional elevation showing a holding pin by which the mold frame is held stationary, said pin being projected to its holding position.

Figure 29 is a similar view but with the holding pin retracted.

Figures 30, 31 and 32 are diagrammatic views of the oscillating arm forming part of the indexing mechanism.

Figures 33, 34 and 35 are part sectional views showing the driving pin and a cam for projecting the same, the positions of parts in these views corresponding respectively to those of Figures 30, 31 and 32.

Figure 36 is a detail view of the hand crank for driving the glass feeding mechanism independently of the machine.

Figure 37 is a fragmentary plan view of a clutch for disconnecting the feeding mechanism from the machine.

Figure 38 is a sectional elevation of said clutch.

Figure 39 is a part sectional elevation showing transmission mechanism between the motor, flowing apparatus and other parts.

Figure 40 is a plan view of such transmission mechanism.

Figure 41 is a plan view of a valve plate showing the position of ports controlling the supply of air to the molds.

The machine comprises a stationary frame 40 including a central column 41, and a lower annular casting 43 surrounding the central column and bolted thereto. Mounted for step by step rotation around the central column 41 is a mold carriage on which the molds are supported. This carriage comprises a lower framework in the form of a table or spider 44 and an upper frame, also comprising a table or spider 45. Columns 46 secured to and projecting upwardly from the frame 44 are clamped to the upper frame 45 by means of bolts 225 (Fig. 7). By loosening these bolts the frame 45 is free for vertical adjustment to permit blank molds of different lengths to be used, as pointed out hereinafter. A non-rotating frame member 42 surrounding the column 41 provides a support for the upper rotating member 45 of the mold carriage, roller bearings 48 being interposed between the frames 42 and 45. The frames 45 and 42 are adjusted vertically by means of rods 226 projecting upward therefrom and connected by a yoke 227, the latter comprising a threaded sleeve working on a screw shaft 228 rotatable by a handle 229. By rotating the shaft 228 the frames 42 and 45 are adjusted up or down. The frame 44 runs on roller bearings 47. A non-rotating cam plate 139 secured to the frame 42 controls the opening and closing of the blank molds, as more fully described later. A cam carrying frame 49 surrounding the central column 41 is arranged to oscillate about said column, being connected with the mold carriage to rotate therewith as the latter advances, and disconnected from the mold carriage and returned while the latter remains stationary. This cam frame 49 carries a cam plate 150 controlling the opening and closing of the finishing molds, and a cam plate 230 having cams for inverting the neck mold, for opening it, and for actuating the valve plungers. The oscillating cam frame runs on roller bearings 231.

The machine frame 40 is mounted on a base or truck 50 having wheels 51 which run on tracks 52, so that the machine may be moved toward and from the furnace from which the molds are charged. The rails 52 are mounted for vertical adjustment by means of the apparatus shown in Figs. 4 and 5, thereby permitting molds of different lengths to be adjusted to the charging apparatus. The rails are united by cross bars 53 and 54 forming a framework, to the corners of which are secured depending posts 55 movable up and down in sockets 56. The posts 55 are screw threaded and have mounted thereon sprockets 57, the hubs of which are internally threaded so that as the sprocket wheels are rotated the posts 55 are caused to move up or down, thereby lifting or lowering the rails 52. A sprocket chain 58 runs on all of the sprocket wheels 57 so that the four corners of the frame are simultaneously lifted and lowered when said chain is driven. The means for driving said chain includes a hand crank 59 for driving a gear train, comprising a beveled pinion 60, a beveled gear 61 and pinion 62 on a shaft 63, gear wheel 64 driven by the pinion 62, a pinion 65 and gear wheel 66 meshing therewith, the latter connected to rotate with a sprocket wheel 57. A motor or other source of power may be substituted for the hand crank 59. The tension of the sprocket chain 58 is adjusted by a tension device comprising an idler sprocket 68 and adjusting rod 69.

The molds are arranged in sets, each including a body blank mold 81, a neck mold 82 and a finishing mold 83. When in charging position, the blank mold is in register with the neck mold and projects upwardly therefrom, being open at its upper end to receive the charge of glass. The blank mold and neck mold together form a parison mold, arranged neck downward, or in an inverted position to receive the charge.

The glass is preferably supplied from a continuous stream of glass which is automatically severed into individual charges and delivered to the molds by the apparatus which forms the subject matter of my Patent No. 1,353,907, granted September 28, 1920. The blank molds are brought successively to charging position directly beneath a boot or extension 200 (Fig. 39) on the glass melting furnace. The stream of glass as it flows from an opening in said boot is collected in a sectional cup 201 to form gobs which are automatically severed from the flowing stream by a knife 202 as they drop through a funnel or guide 80 into the blank mold 81 therebeneath.

The several steps in forming the bottle or other article are briefly as follows:— When a gob of glass has been dropped in the mold, the mold carriage is rotated a step to bring the mold to the next station where a blow head is applied to the upper end of the mold. Air under pressure is supplied through the blow head to cause the glass to conform more perfectly to the shape of the mold, particularly the neck mold. The neck mold plunger is then withdrawn and a puff of air supplied through the neck mold to cool the inside of the neck of the bottle so that the cavity will retain its shape. The mold frame is now advanced another step to bring the mold to the next station where a closure is applied to the open end of the mold. Compressed air is then applied through the neck mold to blow glass up against the closure, which forms the bottom of bottle, and also the increasing size of the interior cavity of the blank. The mold carriage is again advanced and the body blank mold is opened, leaving the parison projecting upwardly from the neck mold. The neck mold is now rotated to swing the parison outwardly and downwardly into the open blow mold directly beneath, which then closes, and the bottle is blown to its finished form. The mechanism for effecting these operations will be described in detail hereinafter.

The machine as herein shown comprises eight sets of molds arranged at equal intervals around the periphery of the mold carriage. The carriage, as before noted, is rotated step by step to bring the molds successively to the stations at which the various operations are effected. These stations are for convenience designated by the Roman numerals I to VIII, the charging station being designated I. The carriage is rotated through 45 degrees or one eighth of a complete revolution at each step.

The indexing mechanism for rotating the mold carriage will now be described.

Referring to Figs. 1, 25 to 35 inclusive, 39 and 40, a motor 85 is connected through a pinion 203 and gear 204 to drive a worm 86, which runs in mesh with a worm wheel 87 secured to a vertical drive shaft 88, which is eccentric to the main axis of the machine. A rock arm 89 (Fig. 26) fixed to the main cam frame 49 (Fig. 1) for oscillating the latter, is driven from the shaft 88 through the following means. On the upper end of the shaft 88 is a disc 90 (Fig. 25) carrying a pivot pin 91 on which is mounted a block 92 slidable in a slot or guideway 93 extending radially in the oscillating arm 89. It will be seen that with this arrangement the slide block 92 revolving continuously with the drive shaft, oscillates the arm 89 while said block reciprocates in the guideway 93. The arm 89 moves through an arc of 45 degrees, and during its forward or clockwise movement, is connected with the mold carriage for advancing the latter, but during its return is disconnected from the mold carriage, permitting the latter to remain stationary. The connection between said arm and the mold carriage is effected by a driving pin 94 movable vertically to engage sockets 95 (Fig. 25) in the mold carriage. The driving pin 94 is moved into and out of the sockets 95 by means of a cam groove 96 in the slide block 92, in which groove runs a wrist 97 on the pin 94.

In Figs. 30 and 33 the arm 89 is at the limit of its forward swing while the cam block 92 is moving outwardly along said arm, and the wrist 97 is at the bend or inclined portion 98 of the cam slot, so that at this point the driving pin 94 is withdrawn from the mold carriage. The latter is thus released and remains disconnected from the arm 89 until the latter has completed its return movement, that is, to the position shown in Fig. 27. Then the driving pin is again actuated by the cam and projected upward in a succeeding socket 95, so that the mold frame is advanced as the drive arm 89 swings forward. By reference Figures 34 and 35 it will be seen that the slide block 92 is entirely disconnected from the driving pin 94 while said block is near the limits of its radial movement. The pin 94 is yieldingly held in both its projected and retracted positions by a spring actuated detent 99 (Fig. 25).

A locking pin 100 is adapted to be projected into sockets 101 in the mold carriage for positively holding the latter stationary during the return movement of the driving arm 89. This locking pin is provided with a cam roll 102 which runs in a cam slot 103 formed in a slide bar 104. The latter is connected through a link 105 to a rock arm 106 on a vertical rock shaft 107. An arm 108 also connected to the rock shaft, carries a cam roll 109 which runs on a cam 110 mounted to rotate with the disc 90. The cam 110 is so positioned and of such length that it holds the arm 108 outward so that the locking pin 100 is in its retracted position (Figs. 27 and 29) during the forward movement of the drive arm. As the disc 90 reaches the Fig. 26 position in which the drive arm is at the limit of its forward movement the roll 109 runs off the cam, permitting the slide bar 104 to be moved inwardly, thereby projecting the locking pin, so that the mold carriage is locked and held stationary until the drive arm 89 completes its return movement. A spring 125 acting through a yoke or arm 165 on the rock shaft 107, holds the cam roll 109 against the cam disc. The locking pin and driving pin are so timed that each is projected just as the other is withdrawn, so that the mold frame is always under the control of said pins.

It will be observed that with the indexing mechanism above described, including the worm gearing, a smooth and powerful driving action is obtained. Ample power is thus provided for rotating the mold carriage and cam frame, while the starting and stopping of said parts is smooth and gradual. It will be further noted that the forward movement of the driving arm 89 is more rapid and accomplished in a substantially less time than its return movement. That is, the forward movement is accomplished while the block 92 is making less than half its revolution with the disc 90. This will be readily seen from a consideration of Figures 26 and 27 which show the arm at the limits of its movement. This feature is desirable as it reduces the length of time consumed in advancing the mold carriage and increases the comparative length of time permitted for accomplishing the blowing and other operations which take place at the different stations.

The mechanism for driving the glass feeding apparatus will now be described. Referring to Figs. 36 to 40 inclusive, the vertical drive shaft 88 has mounted thereon below the worm gear 87 a spiral gear 205 running in mesh with a gear 206 on a shaft 207 extending diagonally beneath the truck 50. On the shaft 207 is a spiral gear 208 which drives a gear 209 on a shaft 210. The latter is connected through a universal joint 211, rod 212 and universal joint 213 to a shaft 214. The latter is connected through a clutch 215 (see Fig. 37) to drive a pinion 216 which drives a gear 217 on a vertical shaft 218. The shaft 218 is connected through a universal joint 219 with a vertical cam shaft 220 carrying cams for actuating the divided cup 201 and cut-off 202, as more fully disclosed in my patent above referred to.

The gearing at the lower end of the shaft 220 is mounted in a casing 222 which may have a fixed position, while the gears 208 and 209 are mounted in a casing on the truck 50. In order to permit the truck 50 with the machine thereon to be moved toward and from the furnace without interfering with the driving connections for the flowing apparatus, the shaft 210 is slidable lengthwise in its bearings, the gear 209 being feathered on said shaft to permit this sliding movement while maintaining a driving connection between said gear and shaft. The flowing apparatus may be disconnected from the driving motor by opening the clutch 215 which for this purpose is provided with a hand lever 223. The latter may be engaged behind a shoulder 224 to hold the clutch open.

When it becomes necessary for any reason to temporarily stop the machine or stop the operation of the flowing apparatus, the stream of molten glass will continue to flow from the discharge opening in the boot 200. If the machine should be stopped while the cup 201 is closed with the cut-off 202 beneath said cup the glass in the cup would quickly become cooled sufficiently to adhere to the cup and cut-off and the mechanism would be clogged with the frozen glass. In order that this flowing cup may always be left open when the apparatus is stopped so that the stream of glass may flow without touching the apparatus, I provide a hand operating device, as shown in Fig. 36. This comprises a hand crank 225 operable through a beveled pinion 326 and gear 327 to rotate the vertical shaft 218, 220. The hand crank is movable longthwise in its bearings and is normally held outward by a spring 328 which holds the pinion 326 free from the gear 327. By pressing inward on the hand crank, the gears are connected and may be rotated to bring the cup 201 to open position with the cut-off 202 withdrawn, so that the glass may flow freely through said cup.

The gearing for driving the cut-off mechanism is arranged to operate the latter in synchronism with the step by step movement of the mold carriage. That is to say, after each advance of the mold carriage, the divided cup 201 is opened to discharge the gob of glass accumulated therein and then closed and the knife 202 operated to sever the gob from the oncoming stream. The cup then remains closed until the mold carriage has been advanced another step, when said operation is repeated.

In Fig. 8 a parison mold is shown at the charging station I. The charge of glass 111 has just been introduced. A plunger 112 is provided with a core 241 which projects upwardly into the neck mold to form an initial blow opening. The mold carriage is now rotated one step to bring the charged mold to station II, at which air under pressure is introduced at the top of the mold for pressing the glass downward to completely fill the neck mold and properly shape the neck of the bottle. This air is introduced through a blowing head 113 which is moved vertically downward against the top of the mold, said head being provided with a passage 114, through which air under pressure is admitted. The blowing head is then withdrawn vertically to clear the mold, permitting the latter to be advanced to station III.

The mechanism for lifting and lowering this blowing head will now be described.

Referring to Figs. 20 to 22, the head 113 is carried by a stem 115 movable vertically in a frame 116. A head 117 positioned to co-operate with the mold at station III is likewise vertically movable in the frame 116. This frame is supported on the central column 41 and a column 242 (Fig. 1). By loosening the bolts 243 which clamp the frame to said columns, the frame is freed for vertical adjustment. Such adjustment is effected by an adjusting rod 244 connected to the frame 116 and rotatable by means of a hand bar 245. Said rod is threaded through a cross bar 246 mounted on the columns 41 and 242, so that as the rod is rotated it travels up or down, carrying with it the frame 116. The two heads 113 and 117 are simultaneously lifted by a longitudinally sliding cam bar 118, provided with cam faces which engage rolls 119 on the stems 115. In Fig. 21 said heads are shown in their elevated position. When the bar 118 is moved to the right said heads are permitted to move downward under the influence of springs 120 to engage the blank molds therebeneath. Said springs give sufficient pressure to counter-balance any lifting tendency due to air pressure in using the blowhead.

The mechanism for actuating the cam bar 118 will be understood by reference to Figs. 20, 26 and 27. The rock shaft 107 has secured thereto a rock arm 121 connected through a link 122 to the cam bar 118. The shaft 107, as heretofore described, is controlled by the cam 110, being rocked to the Fig. 26 position as the mold carriage completes its forward step rotation. This rocking of the shaft 107 operates through the connections described, to move the bar 118 to the Fig. 22 position, thereby lowering the heads 113 and 117. It will thus be seen that the heads are lowered on the molds as the latter are brought to rest at stations II and III, and are lifted as or just before the molds are again advanced.

An arm 123 loose on the shaft 107, projects into the path of a roll 124 on the driving arm 89. As the latter moves forward, the roll 124 swings the arm 123 from the Fig. 27 position to the Fig. 26 position. As the drive arm 89 returns, the arm 123 is disengaged, permitting it to be returned by the spring 125 to the Fig. 27 position where it is held against a stop 126. The spring 125 by opposing the final forward movement of the driver 89, materially assists in overcoming the momentum of the mold frame and bringing it gradually and smoothly to a stop. The energy stored up in the spring 125 also supplies power to assist in starting the cam frame on its return movement.

When the glass has been compressed in the parison mold at station II, the blowing head 113 is lifted by the mechanism above described. The plunger 112 is also drawn downward preparatory to blowing the blank in the parison mold, and a puff of air admitted to the initial blow opening formed by the plunger core. This puff of air insures a complete conformation of the glass to the neck mold and cools the inside of the neck of the bottle so that it will retain its shape and not fill up again with soft hot glass immediately after the plunger core is withdrawn. The mold carriage is now advanced another step, bringing the mold to station III. At this station (see Fig. 10) the head 117 is lowered onto the mold to close the upper end thereof. The plunger core 241 is now in its downward position away from the blank, and air under pressure is admitted to the initial blow opening formed by said plunger, so that the blank is blown in the parison mold, as shown in Fig. 10.

The means for actuating the plunger 112 with its core 241 will be understood by reference to Figs. 14 and 15. Such means comprises cams 247 and 248 mounted on sections 249 and 250 respectively of the cam plate 230, said cam plate being clamped to and forming part of the oscillating cam frame 49. By loosening the clamping bolts said cam plate may be adjusted vertically to correspond to the hereinbefore described vertical adjustment of the frame 42. A plunger actuating lever comprising arms 132 and 133 is pivoted at 134 on a blowing head 135 on which the neck mold is mounted. A cam roll 131 on said lever is arranged to be operated by the cam 248 while at station VIII, to lift the plunger, and by the cam 247 while at station II, to lower the plunger. As the cam frame 49 is completing its return movement the cam 248 depresses the roll 131 at station VIII, thereby operating the lever 132, 133 to lift the valve plunger and core. Also during such return movement of the cam frame 49 the cam 247, as it passes station II, engages beneath the cam roll 131 at said station, lifting said roll and thereby lowering the valve plunger and core. The lowering of the plunger not only withdraws the core 241, leaving an intitial blow opening in the blank, but at the same time opens a port 136 controlled by the plunger, thus admitting first, a puff of air through the neck mold, as before pointed out, and later sufficient air to blow the parison up, forming the bottom and partially forming the bottle in the blank mold, as indicated in Fig. 10. The two arms 132 and 133 are normally held extended by a spring 252. This permits the arm 132 to run under the cam 248 without lifting the plunger or placing an excessive strain thereon if the upward movement of the plunger is obstructed. A friction block 137 (Fig. 14) is held by a spring 138 against the plunger, thereby holding the latter against accidental displacement while out of the control of its cams.

After the parison has been blown in the blank mold, the head 117 is lifted and the carriage advanced to bring the mold to station IV. During the movement of the blank mold from station III to station IV it is opened, as indicated in Fig. 2, to permit the parison to be transferred to the finishing mold.

The mechanism for opening and closing the blank molds is shown in Figs. 1, 2 and 7. This mechanism comprises a stationary cam disc 139 formed on its under surface with a cam track 140 on which run rolls 141 on blocks or arms 255 having spring detent connections 256 with yokes 142. Each blank mold is made in sections provided with ears 449 having openings to receive pivot pins 146 projecting upward from a pair of arms 143 pivoted at 144 to a plate 254 bolted to and forming part of the mold carrying frame 45. Links 145 are pivoted on pins 146 and at 147 are pivoted to the arms 148 of the yoke 142. The outer ends of the yoke arms 148 are slidable in guideways 149. The cam track 140 (Fig. 2) is so formed that as the mold moves from station III to station IV the wrist 141 is drawn inwardly toward the center of the machine, thus moving the yoke 142 radially inward and operating through the links 145 to separate the mold sections. The links 145 form with the mold sections, toggle connections so arranged that when the mold is closed, each toggle joint 146 is at or just past the dead center position, so that the mold is positively held closed. It will be observed that the shank of the yoke is of considerable length, providing ample bearing surface for holding the yoke and mold sections against any lateral play and thereby holding the mold accurately centered. The mold sections may be readily removed by lifting them from the pivot pins 146.

When the blank mold is opened at station IV the parison is supported solely by the neck mold and projects upwardly therefrom. The bare blank while thus supported in the neck mold is swung downwardly into the open finishing mold 83 directly therebeneath. The mechanism for opening and closing the finishing molds (see Figs. 1, 3, 6 and 19) comprises a cam plate 150 secured to the oscillating cam frame 49, said plate provided with a track 151, in which run the wrists 152. The mechanism through which motion is transmitted from the wrists for opening and closing the molds is similar to that for the blank mold shown in Fig. 7, and comprises a radial sliding yoke 153, mold carrying arms 154 pivoted at 155 and links 156 connecting the mold sections with the sliding yoke. The oscillating cam plate 150 is shown in Fig. 19 at the limit of its forward movement, and the blow mold at station III is closed. As the cam plate returns to Fig. 3 position the mold at station III is opened. When the cam plate again advances with the mold carriage, there being no relative movement of said plate and carriage, the mold moving from station III to station IV remains open so that it may receive the blank. The cam track 151 is so formed that as it again returns to Fig. 3 position the mold at station IV is held wide open, at least until the blank has been received therein, after which the mold may be partly closed.

The mechanism for swinging the blank downward into the finishing mold will be understood by reference to Figs. 1, 11, 14 and 15. As before noted, the neck mold 82 is carried on the blowing head 135. The latter is mounted on horizontal bearing shafts 157 and 162, permitting said head with the neck mold and parison to be rotated about a horizontal axis to swing the parison outwardly and downwardly through 180 degrees, so that the parison is brought to the pendant position shown in Fig. 11. The neck mold is now just above the blow mold and in position to register therewith when the latter closes, as shown in Fig. 12. The head 135 is rotated by a rack 158 running in mesh with a gear 159 keyed to said head. The rack bar 158 is connected to a block 163 having a roll 160 which runs in cam tracks 161 and 361 on the cam plate 230. The track 361 is so formed that the rack bar is moved radially outward to swing the blank down while the mold carriage is stationary with the blank at station IV and the cam on its return movement. The block 163 has a driving connection with the rack bar through a spring held detent 164 (Fig. 15) which will yield under abnormal resistance of the rack bar, protecting the parts driven thereby if their movement is obstructed.

The neck mold head 135 is locked in register with the blow mold by a spring pressed detent 280 (Figs. 11 and 11ᴬ) which engages between lugs 281 on the head. A pin 282 on said detent lies in the path of the mold carrying arm 143, so that as the blank mold opens the detent is withdrawn, and the head left free to be rotated. A pair of lugs 281 is provided at each end of the head 135, so that the detent 280 may lock the head at either limit of its movement. The rotation of the head is limited in both directions by a stop 283 in the path of lugs 284 on the head. The outward movement of the block 163 (Fig. 15) is continued a slight distance beyond the point at which the blow head 165 is arrested by the stop 283, the beveled detent being forced slightly outwardly against its spring during this final movement, so that the blow head is held with a yielding pressure against its stop. The pin 282 is so positioned on the detent that the latter is withdrawn only when the blank mold is opened wide. By reference to Fig. 2 it will be seen that this takes place at station IV to permit the blank to be inverted. The blank mold is then partly closed, sufficient to permit the detent to lock the neck mold head in its inverted position, and hold it until it reaches station VIII, where the blank mold is again opened wide and the head thereby released to be re-inverted.

The finishing mold is advanced from station IV to station V, and as the cam 151 returns, it completely closes the mold around the parison, the parts being now in the posion shown in Fig. 12. Compressed air is now admitted through the passageway in the shaft 157 and blows the bottle B to its finished form, as shown in Fig. 13. The finishing mold remains closed with the bottle therein until it has been brought around to station III, at which it is opened as shown in Fig. 3, to permit the discharge of the bottle preparatory to receiving another parison at station IV, as above described.

A tiltable bottom 180 (see Figs. 12, 17 and 18) is provided for each finishing mold. This bottom is formed with a downward projection or stem 181 which enters a socket in a holder 182 connected by a pivot 183 to the mold frame. A spring held detent which may be withdrawn by a knob 184, engages an annular groove 185 in the stem 181 to removably hold said bottom, permitting the latter to be readily removed or replaced by a different mold bottom. When the blow mold 83 is closed, the mold carrying arms 154 hold said bottom up.

When the mold with the finished bottle therein has been brought to station III, it is opened during the initial portion of the return movement of the cam frame 49, as heretofore described. A cam 260 (Figs. 17 and 26) carried by the arm 89 on the cam frame 49, is brought during the opening of the mold into position to support the mold bottom 180, as shown in Fig. 17. As the cam 260 continues its movement it allows the mold bottom and bottle thereon to be gradually tilted by gravity to the Fig. 18 position, permitting the bottle to drop from the machine. A spring 263 permits the cam 260 to yield under any excess pressure.

A lifting cam 264 (Fig. 26) also mounted to swing with the arm 89, serves to lift the mold bottom 180, after the bottle is discharged, into position to be held up by the finishing mold when the latter closes, and said bottom is thereafter held up by the finishing mold until it is again brought to its discharging position at station III. The lifting cam 264 is pivoted at 265 and may swing inward, compressing a spring 666 so that if any obstruction prevents the mold bottom from being lifted before the mold closes, the bottom may remain down without injury or breakage of parts. The position of the lifting cam may be accurately adjusted by an adjusting screw 266.

After the parison has been lowered and enclosed in the blowing mold, the neck mold is opened to disengage the neck of the bottle and permit the neck mold head to be reinverted preparatory to receiving a new charge. Referring to Figs. 7, 14, 15 and 16, the neck mold 82 is made in sections pivoted on a pin 270 mounted in the head 135. The mold is opened by means of a yoke 271 mounted to reciprocate on the head 135. This yoke carries pins 272 which as the yoke is moved to the right (Fig. 16) engage lugs 273 on the mold sections and swing the latter about their pivot pin 270 to open position. Attached to the yoke 271 are rods 274 carrying at their outer end a cross bar and cam roll 275. A cam 276 (Fig. 15) is positioned to engage the cam roll 275 during the return movement of the cam frame 49 while the neck mold is at station VI, thereby moving said roll radially outward and thus opening the neck mold.

When the neck mold head 135 is re-inverted at station VIII the weight of the parts serves to return the yoke 271, or at least to move it part way towards the Fig. 16 position. The yoke as it is returned engages the inclined edges 276 of the mold sections and forces them to closed position so that the mold is positively held closed between the ends of the yoke. A positive movement of the yoke to mold closing position is insured by a pair of links 277 in the form of a toggle connected to the blank mold arms 143 (see Fig. 7). These links hold the neck mold closed as long as the blank mold remains closed.

The construction of the machine and the cycle of operations in forming a bottle have been described in connection with a single set of molds. It will be understood, however, that the operation of the several sets of molds is taking place concurrently, each set of molds being at a different point in the cycle of operations, so that after each step in the rotation of the mold frame a finished bottle is discharged from the machine and a charge of glass introduced.

Referring to Figs. 23 and 24, a bank of valves and actuating means therefor are provided for controlling the supply of compressed air for the several blowing operations. These valves may comprise a valve 188 controlling the supply of air to the blow head 113, a valve 189 controlling the air for an initial puff when the plunger 112 is withdrawn, a valve 190 controlling the blowing of the parison in the blank mold, a valve 191 controlling the final blowing in the finishing mold, and an extra valve 192 which may be brought into use for controlling a supply of air for cooling the molds, or any other desired purpose. These valves are controlled by cams 193 mounted on a vertical rock shaft 194, the cams being rotatably adjustable on the shaft for properly timing the operation of the valves. The rock shaft is provided with a rock arm 195 connected through a link 196 to the oscillating cam frame 49. The air under pressure is supplied through the main feed line 197 from any suitable source of supply.

The supply of air from the main feed line through the several valves shown in Fig. 23 is controlled by a master valve 290 (Fig. 25) from which lead pipes 291 extending to the bank of valves (Fig. 23). This master valve is actuated by a cam 292 on which runs a cam roll 293 on the valve stem. The cam 292 is carried by the continuously rotating disc 90 and is given one complete revolution for each step rotation of the mold carriage. This cam is formed to hold the master valve closed while the mold carriage rotates, thereby cutting off the supply of air through the bank of valves (Fig. 23) to the blowing heads. It will thus be seen that as the shaft 194 rocks in one direction, its cams operate the several valves to supply air to the molds, but during the reverse movement of the shaft the valves, although again opened, do not admit air to the blowing heads, as at this time the supply is cut off by the master valve.

The supply of air through the valve 188 (Fig. 23) is conveyed through pipe 294 directly to the single blow head 113 (Fig. 9). Each of the pipes 295, 296 and 297 leading respectively from the valves 189, 190 and 191 is brought into communication with each of the neck mold-carrying blow heads 135 in succession. In order that the air may be supplied to the blow heads 135 only while at the stations where the blowing operations are effected, the three pipes 295, 296 and 297 lead respectively to ports 298, 299 and 300 (Fig. 41) in a stationary ring 301 surrounding the central column of the machine. Each blow head 135 (Fig. 11) is supplied with air through a conduit 302, and each of said conduits terminates in a valve or port 303 (Fig. 1) arranged to be brought in register with the ports 298, 299 and 300 at stations II, III and VI respectively. Thus when a mold is brought to station II, its conduit 302 registers with the port 298 so that when the valve 189 (Fig. 23) is actuated, the blow head at station II is supplied with a puff of air, whereas the blow heads at the other stations are all disconnected from the air supply. In like manner when the mold is at station III the blow head is in communication through port 299 with the valve 190 for blowing the blank. Also when the mold reaches station VI, air is admitted through port 300 for the final blowing in the finishing mold.

Modifications may be resorted to within the spirit and scope of my invention.

What I claim is:—

1. In a glass forming machine, the combination of a blowing head, a neck mold, a body blank mold in vertical alignment with the body blank mold, a finishing mold, automatic means to swing said blowing head and neck mold as a unit about a horizontal axis into co-operative relation alternately to the blank mold and finishing mold, and automatic means for supplying air through said head to the blank mold and finishing mold.

2. In a glass forming machine, the combination with a rotary mold carriage, of a blowing head, a neck mold mounted thereon, a body blank mold, a finishing mold, said head and molds mounted to rotate with the carriage, means to rotate said head about a horizontal axis and thereby move the neck mold from the blank mold to the finishing mold, and automatic means to supply compressed air through said head to both the blank mold and the finishing mold.

3. In a glass forming machine, the combination with a rotating mold carriage, of a body mold thereon, an end mold for forming one end of the glass article, said end mold being beneath the body mold, with the mold cavities in register, a blow head carried on the carriage to rotate therewith and on which the end mold is mounted, means to open the body mold leaving the parison supported in said end mold and projecting upward therefrom, means to rotate said end mold and blow head as a unit and swing the bare parison by a continuous movement about a horizontal axis from said projected position to a depending position, the parison being unsupported except by the end mold during said swinging movement, and automatic means for supplying air pressure through the blow head and thereby blowing the parison to form a finished article while in said depending position.

4. In a bottle forming machine, the combination with an inverted parison mold having a charge opening at its upper end to receive a charge of molten glass, of means to apply pressure through said opening for forming the neck of the bottle, a core or plunger to form an initial blow opening in said neck, means for blowing air upwardly through said blow opening in sufficient volume and pressure to blow the glass in the parison mold to hollow form to partially form the bottle in the parison mold, a finishing mold, and means for transferring the parison to the finishing mold and blowing it to its final form.

5. In a bottle forming machine, the combination of a parison mold comprising a body blank mold and a neck mold at the lower end of said blank mold for forming the neck of a bottle, the upper end of said body mold being open to receive the charge of glass, means to form an initial blow opening in the neck of the bottle, a head to form a closure for said charge opening, means for blowing air upwardly through said blow opening in sufficient volume and pressure to blow the glass in the body mold to hollow form and partially form the bottle, means to then open the body blank mold, leaving the bare hollow blank supported by the neck mold, a finishing mold, and automatic means to operate the neck mold for transferring the blank to the finishing mold.

6. In a glass forming machine, the combination of a carriage, means to rotate it, a neck mold, a body blank mold above the neck mold and open at its upper end to receive a charge of glass, a blowing head on which said neck mold is mounted, a plunger carried by said head to form an initial blow opening in the blank, means to supply air through said head and blow the blank to hollow form in the blank mold, a finishing mold beneath said head, means for opening the blank mold, and means for rotating said head about a horizontal axis to swing the bare blank downward into the blow mold, said blowing head and molds being mounted on the carriage to rotate therewith, and means whereby the opening and closing movements of the molds, the rotation of said head, and the blowing operations are controlled by the operation of the carriage rotating means.

7. In a glass forming machine, the combination with a mold carrying frame rotatable about a vertical axis, of a series of blank molds carried thereby at equal intervals around said axis, a series of blow molds located respectively beneath the blank molds, means to supply charges of molten glass to the several blank molds in succession, devices to successively swing the blanks from the blank molds outwardly and downwardly into position to be enclosed in the blow molds, and means to supply air under pressure to the blank molds and blow molds through said devices while the latter are stationary.

8. The combination with a mold carriage rotatable about a vertical axis, of a blank mold and a finishing mold mounted on the carriage to rotate therewith, a blowing head mounted on the mold carriage in position to co-operate with said molds, means to supply air under pressure through said blowing head to partly form a charge of glass in the blank mold, a device for holding the blank, and automatic means to rotate said head and holding device as a unit in timed relation to the rotation of the carriage and swing the bare blank by a continuous movement from the position in which it was blown in the blank mold into the finishing mold.

9. The combination with a mold carriage rotatable about a vertical axis, of a blank mold and a finishing mold mounted on the carriage to rotate therewith, a blowing head mounted on the mold carriage in position to co-operate with said molds, means to supply air under pressure through said blowing head to partly form a charge of glass in the blank mold, a device for holding the blank, and automatic means to rotate said holding device and head as a unit in timed relation to the rotation of the carriage and swing the bare blank by a continuous movement from the position in which it was blown in the blank mold into the finishing mold, said head supplying air under pressure to blow the bottle to its finished form.

10. The combination of a mold carriage, molds thereon open at their upper ends to receive charges of molten glass, means to rotate the carriage step-by-step to bring the molds to different stations, a blowing head at one station, means for moving said head into engagement with the charge opening of a mold and blowing air under pressure on the charge in the mold, a closure for said charge opening at a succeeding station, a second blowing head to supply air under pressure at the lower end of the mold while the charge opening is closed by said closure and effect an initial blowing of the parison, finishing molds on the carriage, and automatic means for transferring the parisons to the finishing molds, said second blowing head being arranged to blow the parisons in the finishing molds.

11. In a glass forming machine, the combination with a mold, of a mold bottom therefor held in position by the mold and tilted by gravity to discharging position when released from the mold, and means to disengage the mold from the article formed therein while the latter is supported on said mold bottom.

12. In a glass forming machine, the combination with a mold, of a tilting mold bottom therefor held in position by the mold, and means to disengage the mold from the article formed therein while the latter is supported on said mold bottom, said bottom arranged to be tilted by gravity to discharge said article.

13. The combination of a rotary frame, sectional molds thereon, bottoms for said molds arranged to tilt by gravity to discharging position when unrestrained, means to open the molds seriatim to release the articles formed therein while said articles are supported on the mold bottoms and permit said bottoms to tilt and discharge the articles, and automatic means to return said bottoms and close the molds.

14. The combination of a rotary frame, sectional molds thereon, tilting bottoms for said molds, means to open the molds seriatim to release the articles formed therein and permit said bottoms to tilt and discharge the articles, a cam to return said bottoms, means to close the mold sections and hold said bottoms, and means to permit the cam to yield under an abnormal resistance of a mold bottom when the latter is prevented from returning to its closed position.

15. In a glass forming machine, the combination with a mold carriage, of means to rotate the carriage step-by-step, comprising an arm mounted to oscillate about the axis of rotation of the carriage, a member rotating about a vertical axis eccentric to said first mentioned axis, and a connecting pin on said member and rotating therewith, said pin having a radial sliding connection with said arm, whereby the latter is oscillated, and means for connecting said arm to the carriage for rotating the latter during the forward movement of said arm.

16. In a glass forming machine, the combination with a mold carriage, of means to rotate the carriage step-by-step, comprising an arm mounted to oscillate about the axis of rotation of the carriage, a member rotating about a vertical axis eccentric to said first mentioned axis, and a driving pin on said member having a radial sliding connection with said arm, whereby the latter is oscillated, a connecting pin carried by said arm, means for actuating said connecting pin to connect the arm with the carriage and rotate the latter during the forward movement of the arm, and means to release said connecting pin and permit the return movement of said arm independently of the carriage.

17. The combination with a mold carriage, of means to rotate said carriage step-by-step about a vertical axis, comprising a worm, a worm gear driven thereby, a vertical shaft for said gear, a disc on said shaft, an arm mounted to oscillate about said axis of the mold carriage a slidebar mounted to reciprocate radially of said arm, a wrist on said disc connected to said slidebar for reciprocating the latter and oscillating said arm, and means forming a driving connection between said arm and the mold carriage.

18. In a glass forming machine, the combination with a mold frame rotatable about a vertical axis, of an arm mounted to reciprocate about said axis, a driving element rotatable continuously about a vertical axis eccentric to the axis of the mold frame, said driving element comprising a connector having a sliding connection with said arm radially thereof, whereby said arm is oscillated and whereby the movement of said arm in one direction is effected in a shorter time interval than its movement in the opposite direction, and means whereby said arm is operative to rotate the mold frame.

19. In a glass forming machine, the combination with a mold frame rotatable about a vertical axis, of an arm mounted to reciprocate about said axis, a driving element rotatable continuously about a vertical axis eccentric to the axis of the mold frame, said driving element comprising a connector having a slidable connection with said arm radially thereof, whereby said arm is oscillated and whereby the movement of said arm in one direction is effected in a shorter time interval than its movement in the opposite direction, a driving pin carried by said arm, and means to automatically project said pin into driving engagement with the mold frame when the arm is at one limit of its movement and to withdraw said pin when the arm is at the opposite limit of its movement, whereby the mold frame is rotated step-by-step.

20. In a glass forming machine, the combination with a mold frame rotatable about a vertical axis, of an arm mounted to reciprocate about said axis, a driving element rotatable continuously about a vertical axis eccentric to the axis of the mold frame, said driving element comprising a connector having a sliding connection with said arm radially thereof, whereby said arm is oscillated and whereby the movement of said arm in one direction is effected in a shorter time interval than its movement in the opposite direction, a driving pin carried by said arm, means to automatically project said pin into driving engagement with the mold frame when the arm is at one limit of its movement and to withdraw said pin when the arm is at the opposite limit of its movement, whereby the mold frame is rotated step-by-step, a locking pin, automatic means to project said pin into locking engagement with the mold frame when the latter has completed its forward movement and thereby positively hold the frame stationary during the return of said arm, and means to withdraw the locking pin when said arm completes its return movement.

21. The combination with a blank mold and a blow mold, of a blowing head, a neck mold carried thereby, means for supplying air under pressure through said head for blowing a blank to hollow form in the blank mold, means for opening the blank mold, means for operating said head to transfer the partly blown blank into the blow mold, and causing it to be blown in the latter to its finished form, and a valve in said head automatically actuated to cut off the supply of air during said transfer.

22. The combination with a parison mold and a finishing mold, of a blowing head through which air under pressure is admitted to said molds, a plunger having a core to form a blow opening in the charge of glass in the parison mold, said plunger forming a valve, and automatic means to actuate the plunger and thereby control the supply of air to the parison mold and to the finishing mold.

23. In a machine for forming glass articles, the combination of a mold carriage rotatable about a vertical axis and comprising upper and lower mold supports, a series of blank molds on the upper support, finishing molds on the lower support, means on said upper support to swing the blanks from the blank molds downwardly into the finishing molds, a central vertical column, a non-rotating supporting frame on which the upper mold frame is supported, means for adjusting said non-rotating frame vertically, and thereby adjusting the blank mold frame up or down to adjust said swinging means to molds of different lengths.

24. In a machine for forming glass articles, the combination of a mold carriage rotatable about a vertical axis and comprising upper and lower mold supports, a series of blank molds on the upper support, finishing molds on the lower support, means on said upper support to swing the blanks from the blank molds downwardly into the finishing molds, a central vertical column, a non-rotating supporting frame on which the upper mold frame is supported, means for adjusting said non-rotating frame vertically, and thereby adjusting the blank mold frame up or down to adjust said swinging means to molds of different lengths, a cam frame arranged to oscillate about said column, a cam on said frame for controlling the opening and closing of the lower molds, and a second cam on said cam frame to actuate the upper molds, said second cam being adjustable vertically to correspond to the adjustment of the upper mold frame.

25. The combination with a mold carriage and a plurality of molds thereon, of apparatus for forming a stream of glass into gobs and discharging them into the molds, means for driving the carriage and bringing the molds successively into positions to receive said charges, driving mechanism for said gob forming apparatus operated in synchronism with the carriage, said apparatus during each cycle of operations being brought into a position to permit the stream of glass to clear said apparatus, and manual means whereby said apparatus may be actuated independently of the movement of the carriage into said position.

26. The combination with a mold carriage and a plurality of molds thereon, of apparatus for forming a stream of glass into gobs and discharging them into the molds, means for driving the carriage and bringing the molds successively into positions to receive said charges, driving mechanism for said gob forming apparatus operated in synchronism with the carriage, manual means whereby said apparatus may be actuated independently of the movement of the carriage into position to permit the stream of glass to clear said apparatus, and means for moving the carriage bodily into and out of operative relation to the charging apparatus while maintaining the operating connections for the charging apparatus.

27. In apparatus for forming glassware, the combination of a mold carriage comprising upper and lower sections, molds on each section, means for transferring a charge from an upper mold to a lower mold, means for relatively adjusting said sections vertically to enable the transfer means to cooperate with molds of different heights, a charging apparatus from which charges of glass are introduced to the upper molds, and means for adjusting the mold carriage bodily up and down to positions corresponding to the length of the molds used.

28. The combination with a mold frame, of molds thereon, a furnace from which molten glass is supplied to the molds, stationary charging apparatus by which the glass is segregated into individual masses or charges and delivered to the molds, tracks on which the mold frame is mounted for movement to bring the molds into and out of operative relation to the charging apparatus, and means to adjust said tracks vertically and thereby adjust the mold frame to positions for charging molds of different sizes.

29. The combination with a mold frame, of molds thereon, a furnace from which molten glass is supplied to the molds, charging apparatus by which the glass is segregated into individual masses or charges and delivered to the molds, tracks on which the mold frame is mounted for movement into and out of operative relation to the charging apparatus, means to adjust said tracks vertically, means forming with said tracks a framework, screw threaded posts on said framework, sprockets threaded on said posts, an endless chain running on said sprockets, and means to drive said chain and rotate the sprockets and thereby cause the posts to move vertically for adjusting the height of the mold frame.

30. The combination of a sectional mold, a tiltable bottom therefor, means to separate the mold sections and leave the article formed thereon supported on said bottom, the latter being arranged to be tilted by its weight and that of the article thereon when unrestrained, a cam arranged to control the tilting of said bottom, and means to actuate the cam.

31. The combination with a rotary mold carriage, of sectional molds thereon, tilting bottoms for said molds, means to open the molds seriatim to release the articles formed thereon and permit said bottoms to tilt to discharge said articles, said bottom arranged to be tilted by gravity a cam to return said bottoms, and means to close the mold sections and hold said bottoms up after they have moved beyond the control of said cam and cause a slow tilting of said bottom.

32. The combination with a blank mold, of a head, means carried by said head to hold one end of the blank after the mold has been opened, means to rotate said head to swing the blank out of the blank mold, a lock to hold said head, and automatic means operated by the opening of the blank mold to release the lock and permit said swinging of the head.

33. The combination with a sectional blank mold, of a neck mold, a head on which said neck mold is mounted, means to open the blank mold leaving a blank supported by the neck mold, means to rotate said head to swing the blank out of the blank mold, a lock to hold said head, and automatic means actuated by the opening of the blank mold to release said lock.

34. The combination with a body mold, of an end mold, a lock to hold the molds in register, means to open the body mold and leave a parison supported in the end mold, and means actuated by the opening of the body mold to release said lock.

35. The combination with a body mold, of an end mold, a lock to hold said molds in register, means to open the body mold and leave a parison supported in the end mold, means actuated by the opening of the body mold to release said lock, a finishing mold, and means to actuate the end mold to transfer the parison to the finishing mold, said lock being operate to hold the end mold in register with the finishing mold.

36. In a machine for forming glassware, the combination with a rotary mold carriage, of sets of molds thereon, each comprising a body blank mold, a neck mold and a finishing mold, means for rotating the carriage step by step whereby each set of molds is brought to a number of mold stations successively, means to introduce charges of glass to the blank molds at one station, means to supply air under pressure at the charge receiving end of the blank molds to the charges of glass for compacting them in the body molds and neck molds at a succeeding station, means for blowing the blanks to hollow form in the blank molds at another station, means operable at a succeeding station to release the body molds from the blanks and transfer the latter while supported in the neck molds to the blow molds, and means operable at a succeeding station to blow the blanks in the finishing molds, all of said operations being effected automatically and concurrently on charges or articles in different stages of development at the several stations.

37. In a machine for forming hollow glassware, the combination with a mold carriage, of molds thereon, means for rotating the carriage step by step to bring each mold to a number of different mold stations in succession, means for forming an article by a series of blowing operations, said operations taking place at different stations, air ducts, valves therein individual to said stations, means providing passageways individual to the molds and arranged to travel with the molds, means whereby as each mold is brought to a blowing station the said passageway individual thereto is thereby brought into communication with the air duct containing the valve individual to said station, and valves individual to said passageways.

38. In a machine for forming hollow glassware, the combination with a mold carriage, of means for rotating the carriage step by step, molds on said carriage, means for forming articles in the molds by a series of blowing operations, said operations taking place at different stations, separate conduits individual to the stations at which the several blowing operations take place, means whereby each mold is brought into communication with said conduits at their respective stations, a separate valve for each conduit controlling the supply of air therethrough, a cam shaft, cams thereon individual to said valves and arranged to actuate the valves, and means to actuate the cam shaft while the carriage is at rest after each step rotation, said cams being each adjustable to regulate the length of time its valve is opened, and thus regulate the length of each blowing operation.

39. In a machine for forming hollow glassware, the combination with a mold carriage, of means for rotating the carriage step by step, molds on said carriage, means for forming articles in the molds by a series of blowing operations, said operations taking place at different stations, separate conduits individual to the stations at which the several blowing operations take place, means whereby each mold is brought into communication with said conduits at their respective stations, a separate valve for each conduit controlling the supply of air therethrough, a cam shaft, cams thereon individual to said valves, means to rock said shaft in one direction while the mold carriage is at rest, and thereby cause the cams to actuate the valves, said shaft being rocked in the opposite direction during the rotation of the carriage, a master valve controlling the supply of air through all of said conduits, and automatic means for actuating the master valve to cut off the supply of air during the rotation of the carriage.

40. In a machine for forming hollow glassware, the combination with a mold table, of means for rotating the table step by step, an oscillating cam, means whereby said cam is caused to advance with the mold table as the latter rotates, and to return while the mold table is at rest, a mold on said table, a plunger having a core to form an initial blow opening in the glass in the mold, and means to supply air under pressure to blow the blank in the mold, said plunger forming a valve controlling the supply of air to the mold, and operable as it is withdrawn from the glass to open the valve, said cam operable during its return movement to withdraw the plunger.

41. The combination with a mold carriage and a series of molds thereon, of means to rotate the carriage step by step, plungers having cores to form initial blow openings in the glass in the molds, means to supply air under pressure to blow the glass in the molds, each of said plungers forming a valve controlling the supply of air to its mold, an oscillating cam arranged to move with the mold carriage as the latter advances, and means to return the cam while the mold carriage is at rest, said cam operable during each return movement to actuate a plunger, said plungers being brought successively into operative relation to the cam by the movements of the carriage.

42. In a glass forming machine, the combination with a mold carriage, of means for rotating it step by step about a vertical axis, comprising an arm arranged to oscillate about said axis, a continuously rotating driver by which said arm is oscillated, a connecting pin carried by said arm and operable automatically to connect the arm with the mold carriage to advance the carriage with said arm, said pin being automatically withdrawn to release the arm and permit its return movement while the mold carriage is at rest, a locking pin, a cam on said driver arranged to project the locking pin and lock the carriage simultaneously with the withdrawal of the connecting pin, and to withdraw the locking pin when said connecting pin is operated to connect said arm to the carriage.

43. In a glass forming machine, the combination with a mold carriage, of means to rotate it step by step about a vertical axis, comprising an arm mounted to oscillate about said axis, a continuously rotating driving member, a cam block carried by said driving member to rotate therewith, and having a radial sliding connection with said arm, whereby the latter is oscillated, a connecting pin carried by said arm and projected by said cam block into locking engagement with the mold carriage when said arm is at the limit of its movement in one direction, said pin being withdrawn by said cam block when the arm reaches the limit of its movement in the reverse direction.

44. The combination with a sectional blank mold, of a neck mold, a head on which said neck mold is mounted, means to open the blank mold leaving the blank supported by the neck mold, a finishing mold, means to rotate said head to swing the blank out of the blank mold into the finishing mold, a lock to hold said head in register with the blank mold, said lock being actuated by the opening movement of the blank mold as the latter approaches a wide open position, and means to partly close the blank mold and cause the lock to hold said head in register with the finishing mold.

45. The combination of a blank mold, a finishing mold, a rotary head, a neck mold carried by said head, means to rotate said head and thereby cause the neck mold to register alternately with the blank mold and finishing mold, a spring detent operable to lock said head in either position, and means actuated by the opening of the blank mold to withdraw said detent from locking position.

46. The combination with a blank mold, of a head, means carried by said head to hold one end of the blank after the mold has been opened, means to rotate said head to swing the blank out of the blank mold, a permanent stop to locate said head, a lock to hold said head, and automatic means to release the lock and permit said head to swing.

47. The combination with a parison mold and a finishing mold, connecting mechanism between the cam and said head and actuated by the cam to shift said head from position to co-operate with one mold into position to co-operate with the other mold, a permanent stop to arrest said head when it reaches said last mentioned position, said connecting mechanism including yielding means to hold said head against the stop, and a lock brought into operation after said head is arrested to hold it independently of the cam.

48. In a glass forming apparatus, the combination of a blank mold open at its upper end to receive a charge of glass, means to supply charges of glass to said mold, means to close said end and increase the air pressure above the glass to thereby apply downward pressure on the glass in the mold, means to form a blow opening in the lower end of the glass, a finishing mold, a blow-head operable automatically to transfer the glass from the blank mold to the finishing mold, said blow-head while at rest forming means to supply air under pressure alternately to the blank mold and the finishing mold and blow the glass to the shape of the respective molds.

49. The combination with a mold carriage and a plurality of molds thereon, of apparatus for receiving a stream of glass and operable to form it into gobs and discharge them into the molds, means for driving the carriage and bringing the molds successively into positions to receive said charges, driving mechanism for said gob forming apparatus operated in synchronism with the carriage, and manual means whereby said apparatus may be actuated independently of the movement of the carriage into position to permit the stream of glass to clear said apparatus and be discharged without being formed into gobs.

50. In a glass shaping machine, the combination of a rotatable mold table, a continously running motor, mechanism for transmitting motion from the motor and intermittently turning said table, mechanism for locking said table between its movements, and retarding means adapted to retard the movements of the table, said retarding means being automatically brought into operation during a portion of each movement of the table.

51. The combination of a rotatable mold table, a motor, gearing driven continuously by the motor, motion translating mechanism between said gearing and table for intermittently rotating the table, mechanism for locking the table between said turning movements, a retarding device adapted to retard the movements of the table, and automatic means for causing said retarding device to operate during the final part of each movement of the mold table.

52. In a glass forming machine, the combination of a mold table, a motor, mechanism by which motion is positively transmitted from the motor to the mold table for rotating the latter, said mechanism including means by which the table is rotated intermittently, a retarding device separate from said motion transmitting means and operable automatically during the final movements of the mold table to oppose the inertia of the mold table and parts moving therewith and thereby assist in bringing the mold table to rest without interfering with the positive movements thereof.

Signed at Evansville, in the county of Vanderburgh and State of Indiana, this 30th day of October, 1917.

JOSEPH B. GRAHAM.